United States Patent
Sung et al.

(10) Patent No.: US 11,003,315 B2
(45) Date of Patent: May 11, 2021

(54) TERMINAL DEVICE AND SHARING METHOD THEREOF

(71) Applicant: SAMSUNG ELECTRONICS CO., LTD., Suwon-si (KR)

(72) Inventors: Ju-yun Sung, Yongin-si (KR); Hyun-soo Nah, Seoul (KR); Hye-rin Kim, Seoul (KR); Jong-chan Park, Seoul (KR); Tae-ho Wang, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 15/441,461

(22) Filed: Feb. 24, 2017

(65) Prior Publication Data

US 2017/0160890 A1    Jun. 8, 2017

Related U.S. Application Data

(62) Division of application No. 14/479,493, filed on Sep. 8, 2014, now abandoned.

(30) Foreign Application Priority Data

Sep. 17, 2013    (KR) .................. 10-2013-0112139

(51) Int. Cl.
*G06F 3/0482*    (2013.01)
*G06F 3/0484*    (2013.01)
(Continued)

(52) U.S. Cl.
CPC ........ *G06F 3/0482* (2013.01); *G06F 3/04842* (2013.01); *G06F 3/04847* (2013.01);
(Continued)

(58) Field of Classification Search
CPC ................. H04L 51/04; H04L 12/1831; G06F 3/048–04897; G06F 3/0482;
(Continued)

(56) References Cited

U.S. PATENT DOCUMENTS 5,848,373 A * 12/1998 DeLorme ............... G01C 21/20
701/455
6,321,158 B1 * 11/2001 DeLorme ............... G01C 21/26
340/995.16
(Continued)

FOREIGN PATENT DOCUMENTS

KR    10-2013-0050871 A    5/2013

OTHER PUBLICATIONS

Communication dated Sep. 8, 2017, from the European Patent Office in counterpart European Application No. 14183398.8.
(Continued)

*Primary Examiner* — Kieu D Vu
*Assistant Examiner* — Alvaro R Calderon, IV
(74) *Attorney, Agent, or Firm* — Sughrue Mion, PLLC

(57) ABSTRACT

A terminal apparatus configured to provide a chatting service, the apparatus comprising: a communicator configured to perform communication with a chatting service counterpart of another terminal apparatus through a server; a display configured to display on a chatting screen of the chatting service at least one application execution screen shared with the chatting service counterpart of the other terminal apparatus; and a controller configured to control the communicator to share a function related to the application execution screen executed according to a user's manipulation with the chatting service counterpart of the other terminal apparatus.

3 Claims, 18 Drawing Sheets

(51) Int. Cl.
*H04L 12/58* (2006.01)
*H04L 12/18* (2006.01)
*G06F 3/0488* (2013.01)

(52) U.S. Cl.
CPC ...... *G06F 3/04886* (2013.01); *H04L 12/1831* (2013.01); *H04L 51/04* (2013.01); *G06F 2203/04803* (2013.01)

(58) Field of Classification Search
CPC ............. G06F 3/04886; G06F 3/04847; G06F 2203/04803
See application file for complete search history.

(56) References Cited

U.S. PATENT DOCUMENTS

| Patent/Pub No. | Date | Inventor | Class |
|---|---|---|---|
| 6,683,538 B1* | 1/2004 | Wilkes, Jr. | G08G 1/20 340/539.1 |
| 6,748,318 B1* | 6/2004 | Jones | G06Q 10/08 340/992 |
| 6,784,901 B1* | 8/2004 | Harvey | H04L 12/1827 709/204 |
| 6,853,911 B1* | 2/2005 | Sakarya | G01C 21/32 701/455 |
| 7,797,642 B1* | 9/2010 | Karam | G06Q 10/107 345/419 |
| 7,917,866 B1* | 3/2011 | Karam | G01C 21/20 455/567 |
| 8,255,810 B2* | 8/2012 | Moore | G06F 3/04817 715/752 |
| 8,606,297 B1* | 12/2013 | Simkhai | H04W 4/023 455/456.2 |
| 9,175,964 B2* | 11/2015 | Forstall | G01C 21/20 |
| 9,647,967 B2 | 5/2017 | Van et al. | |
| 2002/0130904 A1* | 9/2002 | Becker | G06F 3/0481 715/753 |
| 2003/0037110 A1* | 2/2003 | Yamamoto | H04M 3/5322 709/204 |
| 2003/0088623 A1* | 5/2003 | Kusuda | H04L 51/04 709/204 |
| 2003/0154250 A1* | 8/2003 | Miyashita | H04L 29/06 709/204 |
| 2003/0210265 A1* | 11/2003 | Haimberg | H04L 51/04 715/758 |
| 2004/0054428 A1* | 3/2004 | Sheha | G06F 3/04892 700/56 |
| 2005/0273496 A1* | 12/2005 | Jean | H04L 41/22 709/206 |
| 2006/0063539 A1* | 3/2006 | Beyer, Jr. | H04W 4/029 455/456.3 |
| 2006/0184886 A1* | 8/2006 | Chung | G06F 16/954 715/758 |
| 2006/0221858 A1* | 10/2006 | Switzer | G06F 9/451 370/254 |
| 2006/0223518 A1* | 10/2006 | Haney | H04W 4/21 455/420 |
| 2007/0032945 A1* | 2/2007 | Kaufman | G01C 21/20 701/532 |
| 2007/0050716 A1* | 3/2007 | Leahy | H04L 67/16 715/706 |
| 2007/0161382 A1* | 7/2007 | Melinger | H04L 67/18 455/456.1 |
| 2007/0192168 A1* | 8/2007 | Van Luchene | G06F 17/30646 705/14.54 |
| 2007/0208802 A1* | 9/2007 | Barman | G06Q 10/10 709/203 |
| 2007/0270159 A1* | 11/2007 | Lohtia | H04L 12/189 455/456.1 |
| 2007/0288164 A1* | 12/2007 | Gordon | G01C 21/20 701/469 |
| 2008/0036586 A1* | 2/2008 | Ohki | G01C 21/362 340/539.13 |
| 2008/0086368 A1* | 4/2008 | Bauman | G06Q 30/02 705/7.34 |
| 2008/0119200 A1* | 5/2008 | McConnell | H04W 4/02 455/456.1 |
| 2008/0132252 A1* | 6/2008 | Altman | G06Q 30/0268 455/457 |
| 2008/0171555 A1* | 7/2008 | Oh | G01C 21/20 455/456.1 |
| 2008/0182598 A1* | 7/2008 | Bowman | G01C 21/26 455/466 |
| 2009/0005018 A1* | 1/2009 | Forstall | H04M 3/42348 455/414.1 |
| 2009/0005072 A1* | 1/2009 | Forstall | G01C 21/3438 455/456.1 |
| 2009/0005981 A1* | 1/2009 | Forstall | G06F 3/04883 701/431 |
| 2009/0019085 A1* | 1/2009 | Abhyanker | G06Q 10/10 |
| 2009/0041227 A1* | 2/2009 | Altberg | H04M 3/4878 379/265.01 |
| 2009/0061833 A1* | 3/2009 | Ho | H04M 1/72552 455/414.2 |
| 2009/0119255 A1* | 5/2009 | Frank | G06F 40/30 |
| 2009/0125228 A1* | 5/2009 | Dicke | G01C 21/20 701/533 |
| 2009/0204885 A1* | 8/2009 | Ellsworth | G06F 16/489 715/234 |
| 2009/0254840 A1* | 10/2009 | Churchill | G06F 3/0481 715/753 |
| 2009/0288012 A1* | 11/2009 | Hertel | G06Q 20/02 715/738 |
| 2009/0325603 A1* | 12/2009 | Van Os | H04W 4/029 455/456.2 |
| 2010/0070842 A1* | 3/2010 | Aymeloglu | G06F 17/2288 715/207 |
| 2010/0088634 A1* | 4/2010 | Tsuruta | G09G 5/14 715/800 |
| 2010/0110105 A1* | 5/2010 | Kinnunen | G01C 21/20 345/629 |
| 2010/0123737 A1* | 5/2010 | Williamson | G06T 13/80 345/672 |
| 2010/0125785 A1* | 5/2010 | Moore | G06F 3/04883 715/702 |
| 2010/0158097 A1* | 6/2010 | Pascal | G06Q 10/107 375/240 |
| 2010/0205541 A1 | 8/2010 | Rapaport et al. | |
| 2010/0216492 A1* | 8/2010 | Steinmetz | H04L 51/20 455/457 |
| 2010/0261489 A1* | 10/2010 | Almodovar Herraiz | H04L 51/063 455/466 |
| 2010/0332218 A1* | 12/2010 | Liu | H04M 1/72552 704/9 |
| 2011/0010656 A1* | 1/2011 | Mokotov | G06F 3/0481 715/780 |
| 2011/0053578 A1* | 3/2011 | Rochford | H04M 1/72552 455/418 |
| 2011/0080356 A1* | 4/2011 | Kang | G06F 3/0486 345/173 |
| 2011/0081973 A1* | 4/2011 | Hall | A63F 1/00 463/42 |
| 2011/0102459 A1* | 5/2011 | Hall | A63F 13/10 345/633 |
| 2011/0105093 A1 | 5/2011 | Chang et al. | |
| 2011/0137550 A1* | 6/2011 | Choi | G01C 21/3626 701/533 |
| 2011/0161419 A1* | 6/2011 | Chunilal | G06Q 10/00 709/204 |
| 2011/0173337 A1 | 7/2011 | Walsh et al. | |
| 2011/0238302 A1* | 9/2011 | Lee | G01C 21/20 701/408 |
| 2011/0238762 A1* | 9/2011 | Soni | H04L 51/32 709/206 |
| 2011/0246490 A1* | 10/2011 | Jonsson | H04W 4/70 707/755 |
| 2011/0264783 A1* | 10/2011 | Cundill | H04L 67/26 709/223 |

(56) References Cited

U.S. PATENT DOCUMENTS

| | | | |
|---|---|---|---|
| 2011/0298618 A1* | 12/2011 | Stahl | H04M 1/72519 340/573.1 |
| 2012/0008526 A1* | 1/2012 | Borghei | H04W 4/021 370/254 |
| 2012/0110099 A1 | 5/2012 | Fujihara et al. | |
| 2012/0166281 A1* | 6/2012 | Sartipi | G06F 17/3087 705/14.54 |
| 2012/0167154 A1* | 6/2012 | Kim | H04N 21/4122 725/109 |
| 2012/0189272 A1 | 7/2012 | Kunigita et al. | |
| 2012/0226757 A1* | 9/2012 | McFarland | H04W 4/023 709/206 |
| 2012/0290950 A1* | 11/2012 | Rapaport | H04L 51/32 715/753 |
| 2012/0291110 A1* | 11/2012 | Park | H04L 51/20 726/7 |
| 2013/0021368 A1* | 1/2013 | Lee | H04N 1/00177 345/619 |
| 2013/0067389 A1* | 3/2013 | Jin | G06F 3/0486 715/783 |
| 2013/0225087 A1* | 8/2013 | Uhm | H04W 4/12 455/41.3 |
| 2013/0226453 A1* | 8/2013 | Trussel | G01C 21/3614 701/533 |
| 2013/0275531 A1* | 10/2013 | Hahm | H04L 67/30 709/206 |
| 2013/0293664 A1 | 11/2013 | Tsang et al. | |
| 2013/0331070 A1* | 12/2013 | Aldecoa | H04W 4/203 455/414.1 |
| 2013/0332860 A1* | 12/2013 | Jin | H04W 4/024 715/753 |
| 2014/0068467 A1* | 3/2014 | Van | H04L 51/38 715/758 |
| 2014/0068497 A1* | 3/2014 | Park | G06F 3/0481 715/780 |
| 2014/0101553 A1* | 4/2014 | Nagel | G06F 3/0482 715/728 |
| 2014/0114801 A1* | 4/2014 | Ahn | G06Q 30/00 705/26.8 |
| 2014/0136990 A1* | 5/2014 | Gonnen | H04L 51/18 715/752 |
| 2014/0195621 A1* | 7/2014 | Rao Dv | H04L 12/1827 709/206 |
| 2015/0038161 A1* | 2/2015 | Jakobson | H04W 4/02 455/456.1 |
| 2017/0230317 A1 | 8/2017 | Van et al. | |

OTHER PUBLICATIONS

Communication dated Feb. 27, 2015 by the European Patent Office in related Application No. 14183398.8.

Communication dated May 13, 2019, issued by the Korean Intellectual Property Office in corresponding Korean Application No. 10-2013-0112139.

* cited by examiner

TERMINAL DEVICE AND SHARING METHOD THEREOF

CROSS-REFERENCE TO RELATED APPLICATIONS

This application is a divisional application of U.S. application Ser. No. 14/479,493 filed Sep. 8, 2014, which claims priority from Korean Patent Application No. 10-2013-0112139, filed in the Korean Intellectual Property Office on Sep. 17, 2013, the disclosures of which are incorporated herein by reference in their entireties.

BACKGROUND

Technical Field

Methods and apparatuses consistent with the exemplary embodiments relate to a terminal apparatus and a sharing method thereof, more particularly, to a terminal apparatus providing a chatting service and a sharing method thereof.

Description of the Prior Art

With the recent development of electronic technologies, users are being provided with chatting services through terminal apparatuses. For example, users may perform chatting with one or more users through their terminal apparatuses without any restrictions in terms of space and time.

However, in conventional terminal apparatuses, users could send and receive mostly texts and sometimes photos while chatting, and thus there existed limitations in terms of sending information.

SUMMARY

One or more exemplary embodiments may resolve the aforementioned problems, that is, provide a terminal apparatus for sharing with a chatting service counterpart not only chatting contents but also various application execution screens, and a method for sharing thereof.

According to an exemplary embodiment, there is provided a terminal apparatus configured to provide a chatting service, the apparatus comprising: a communicator configured to perform communication with a chatting service counterpart of another terminal apparatus through a server; a display configured to display on a chatting screen of the chatting service at least one application execution screen shared with the chatting service counterpart of the other terminal apparatus; and a controller configured to control the communicator to share a function related to the application execution screen executed according to a user's manipulation with the chatting service counterpart of the other terminal apparatus.

Herein, the controller may further be configured to control such a GUI (Graphic User Interface) corresponding to the user's manipulation to be displayed on the application execution screen and to control the communicator to share the GUI with the chatting service counterpart of the other terminal apparatus.

Furthermore, if the application execution screen is a map screen, the controller may be further configured to control a GUI to be displayed on a point on the map screen selected according to the user's manipulation, and to control the communicator to share the map screen where the GUI is displayed is shared with the chatting service counterpart of the other terminal apparatus.

Furthermore, if the application execution screen is a calendar screen, the controller may be further configured to control a GUI to be displayed on a date on the calendar screen selected according to the user's manipulation, and to control the communicator to share the calendar screen where the GUI is displayed with the chatting service counterpart of the other terminal apparatus.

In addition, the controller may be further configured to execute a function corresponding to a user's manipulation of selecting a menu item on the condition that the application execution screen shared by the chatting service counterpart is displayed and a user's manipulation of selecting a menu item included in the application execution screen is input.

Herein, the controller may be further configured to control access of an address corresponding to the menu item and downloading of an application.

Meanwhile, the controller may be further configured to store a function related to the application execution screen executed according to a user's manipulation in an application corresponding to the application execution screen.

Furthermore, the controller may be further configured to store a function related to the application execution screen executed according to a user's manipulation in an integrated application.

In addition, the controller may be further configured to control the communicator to share a chatting content entered in the chatting screen with the chatting service counterpart of the other terminal apparatus.

Furthermore, the controller may be further configured to control the display to display on one area of the chatting screen a chatting content selected from among chatting contents entered in the chatting screen according to a user's manipulation, and to control the display to display a selecting menu item related to an application execution screen related to the selected chatting content together with the selected chatting content.

Herein, the controller may be further configured to control each application execution screen related to the selected chatting content to be scrapped and stored.

According to an exemplary embodiment, there is provided a sharing method of a terminal apparatus providing a chatting service, the method comprising: displaying on a chatting screen providing the chatting service at least one application execution screen shared with a chatting service counterpart of another terminal apparatus; and controlling such that a function related to the application execution screen executed according to a user's manipulation is shared with the chatting service counterpart of the other terminal apparatus.

Herein, the controlling may involve controlling such that the application execution screen where a GUI (Graphic User Interface) corresponding to the user's manipulation is displayed and is shared with the chatting service counterpart of the other terminal apparatus.

Furthermore, if the application execution screen is a map screen, the controlling may comprise controlling a GUI to be displayed on a point on the map screen selected according to the user's manipulation, and controlling the map screen where the GUI is displayed to be shared with the chatting service counterpart of the other terminal apparatus.

Furthermore, if the application execution screen is a calendar screen, the controlling may comprise controlling a GUI to be displayed on a date on the calendar screen selected according to the user's manipulation, and controlling the calendar screen where the GUI is displayed to be shared with the chatting service counterpart of the other terminal apparatus.

In addition, the method may further comprise executing a function corresponding to the user's manipulation of selecting a menu item, on a condition that an application execution screen shared by the chatting service counterpart is displayed and a user's manipulation of selecting a menu item included in the application execution screen is input.

Herein, the method may further comprise accessing an address corresponding to the menu item and downloading an application.

In addition, the method according to an exemplary embodiment may further comprise storing a function related to the application execution screen executed according to a user's manipulation in an application corresponding to the application execution screen.

In addition, the method according to an exemplary embodiment may further comprise storing a function executed related to the application execution screen executed according to a user's manipulation in an integrated application.

In addition, the method according to an exemplary embodiment may further comprise controlling a chatting content entered in the chatting screen to be shared with the chatting service counterpart of the other terminal apparatus.

In addition, the method according to an exemplary embodiment may further comprise displaying on one area of the chatting screen a chatting content selected according to a user's manipulation from among chatting contents entered in the chatting screen, and displaying a selecting menu item related to an application execution screen related to the selected chatting content together with the selected chatting content.

In this case, the method according to an exemplary embodiment may further comprise controlling each application execution screen related to the selected chatting content to be scrapped and stored.

According to another exemplary embodiment, there is a provided a terminal apparatus having a communicator configured to communicate with a sharing service counterpart of another terminal apparatus through a server, a display configured to display on a screen of the sharing service at least one application execution screen, and a controller configured to control the communicator to share data corresponding to the application execution screen the with sharing service counterpart of the other terminal apparatus.

In addition, the sharing service and the sharing service counterpart may comprise a chatting service and a chatting service counterpart, respectively, and the controller may be further configured to control the communicator to share chatting content entered in the chatting service or the chatting service counterpart.

As aforementioned, according to various exemplary embodiments, it is possible to share not only chatting contents of the users performing chatting but also their application execution screens. That is, users performing chatting service become able to display specific information related to chatting on various types of application executions screens, and share this information with counterparts, thereby improving users' convenience.

BRIEF DESCRIPTION OF THE DRAWINGS

The above and/or other aspects of one or more exemplary embodiments will be more apparent by describing certain present disclosure with reference to the accompanying drawings, in which.

DETAILED DESCRIPTION

Figure 1:
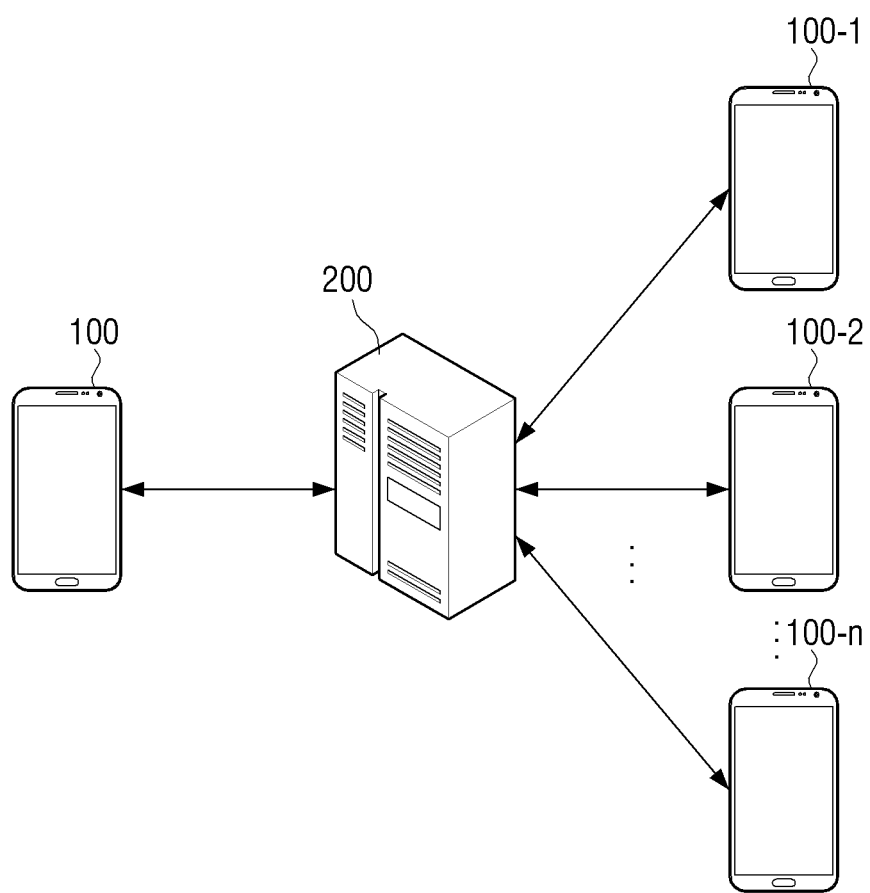
FIG. 1 is a view for explaining a configuration of a system according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view for explaining a configuration of a system according to an exemplary embodiment. According to FIG. 1, the system 1000 may comprise a terminal apparatus 100, server 200, and first terminal apparatus 100-1, second terminal apparatus 100-2, . . . , and nth terminal apparatus 100-n.

Herein, the terminal apparatus 100 and terminal apparatuses 100-1, 100-2, 100-n may be embodied as portable terminal apparatuses such as a mobile phone and tablet etc. Although the terminal apparatus 100 and terminal apparatuses 100-1, 100-2, and 100-n are depicted as portable terminal apparatuses, the terminal apparatuses may be non-portable terminal apparatuses.

Meanwhile, users of the terminal apparatus 100 and terminal apparatuses 100-1, 100-2, . . . , 100-n may be provided with a chatting service through the server 200.

More specifically, the users of the terminal apparatus 100 and terminal apparatus 100-1, 100-2, . . . , 100-n may download a chatting application that the server 200 provides, install the downloaded chatting application in each of the terminal apparatuses 100, 100-1, 100-2, . . . , 100-n, and create an ID and password through a predetermined certification process, and log in on the server 200. Herein, the chatting application may be a chatting application that provides real-time chatting (hereinafter referred to as chatting application). Alternatively, the application may be provided by some means other than the server 200.

In such a case, the server 200 may identify the terminal apparatus 100 and terminal apparatuses 100-1, 100-2, . . . , 100-n through the logged ID, and then either transmit the chatting content entered in the terminal apparatus 100 to the terminal apparatuses 100-1, 100-2, . . . , 100-n, or on the contrary, transmit the chatting content entered in the terminal apparatuses 100-1, 100-2, . . . , 100-n to the terminal apparatus 100, providing chatting services between the users.

Meanwhile, the chatting service may enable sharing not only chatting contents, but also application execution screens between the chatting service users. Herein, the application execution screen may be a map screen, calendar screen, app download screen, and memo screen etc.

For example, the terminal apparatus 100 may display the map screen on one area of a chatting window, and transmit information on the map screen to the server 200. Accordingly, the server 200 may transmit the information on the map screen received from the terminal apparatus 100 to the terminal apparatuses 100-1, 100-2, . . . , 100-n, enabling the chatting services users to share the map screen.

As such, according to the exemplary embodiment, the users performing chatting become able to share not only chatting contents but also application execution screens. In this case, the users are provided with increased convenience, in that the application execution screen may include specific information related to the chatting content.

Meanwhile, it was explained in the aforementioned example that a map screen was shared, but this is just an example, and thus, various types of application execution screens may obviously be shared between users who perform chatting.

In addition, it was explained in the aforementioned example that a user of the terminal apparatus 100 perform chatting with a plurality of users, but this is also just an example. That is, an application execution screen may also be shared in the case where a user chats with only one user.

Figure 2:
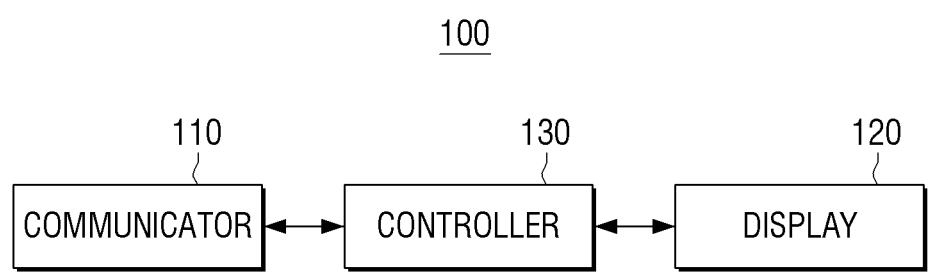
FIG. 2 is a block diagram for explaining a configuration of a terminal apparatus according to an exemplary embodiment.

FIG. 2 is a block diagram for explaining a configuration of a terminal apparatus according to an exemplary embodiment. According to FIG. 2, the terminal apparatus 100 is a terminal apparatus that provides a chatting service, the terminal apparatus 100 comprising a communicator 110, display (or displayer) 120, and controller 130.

Herein, the terminal apparatus 100 may be a terminal apparatus 100 of FIG. 1, or in some cases, one of a first terminal apparatus 100-1, second terminal apparatus 100-2, . . . , and nth terminal apparatus 100-n.

The communicator 110 performs communication with the terminal apparatus (100-1, 100-2, . . . , 100-n of FIG. 1) of the counterpart of the chatting service through the server (200 of FIG. 1). For example, the communicator 110 uses various communication standards such as 3G, 4G, and Wifi, to connect to a network and perform communication with the chatting service counterpart of another terminal apparatus (100-1, 100-2, . . . , 100-n of FIG. 1).

Herein, the server 200 may be a server that relays communication between the terminal apparatus 100 and the terminal apparatuses 100-1, 100-2, . . . , 100-n to provide a chatting service.

Specifically, the server 200 may control such that the users of the terminal apparatus 100 and terminal apparatuses 100-1, 100-2, . . . , 100-n perform chatting with one another and share application execution screens.

The display 120 may display various screens.

More specifically, the display 120 may display at least one application execution screen that is shared with the chatting service counterpart of one or more of the terminal apparatuses 100-1, 100-2, . . . , 100-n on a chatting screen that provides the chatting service.

Herein, the application execution screen may comprise a map screen, calendar screen, app download screen and memo screen etc. In this case, the application execution screen may be a screen provided by a sub function execution of the chatting application itself or a screen provided as functions of other applications are executed through interlocked operation with other applications. Herein, the application may be a native application that was installed in the terminal apparatus 100 when it was manufactured, or an application that was downloaded from outside later on.

Meanwhile, the display 120 may be embodied as a touch screen which receives various touch manipulations and transmits the touch manipulations to the controller 130. In this case, the controller 130 may perform functions according to touch manipulations.

The controller 130 controls the overall operations of the terminal apparatus 100. The controller 130 may comprise a MICOM (or, MICOM and CPU (Central Processing Unit)), a RAM (Random Access Memory) for operating the user terminal apparatus, and a ROM (Read Only Memory). In this case, these modules may be embodied in an SoC (System on Chip) format.

First of all, when a user manipulation for executing an application is input, the controller 130 may execute an application corresponding thereto. In this case, the application installed in the terminal apparatus 100 may be displayed in an icon format, and the controller 130 may execute an application corresponding to the icon touched when the user manipulation of touching the icon is input.

For example, when an icon regarding a chatting application is selected, the controller 130 may execute the chatting application and provide a chatting service to a user.

In this case, the controller 130 may display a list on other users that subscribed to the server 200 through a predetermined certification process so that a chatting service counterpart may be selected. Herein, the user list may be received from the server 200, and the controller 130 may transmit information on the selected user displayed on the list to the server 200. Accordingly, the user may be provided with the chatting service with the selected users through the server 200.

Meanwhile, when a chatting service counterpart is selected from the list, the controller 130 may display a chatting screen that may perform chatting with the users on the display 120.

The chatting screen may comprise a contents display area for displaying information on the chatting service counterpart (for example, name, image, ID, telephone number etc.), a window for receiving entering of chatting content, send item for transmitting the entered chatting content, and the transmitted chatting content.

More specifically, when an input window is selected, the controller 130 may display a virtual keyboard and receive an entering of chatting content, and when a send item is entered, may display the entered chatting content on the contents display area at the same time of transmitting the entered chatting content to the server 200.

In this case, the server 200 may transmit the chatting content received from the terminal apparatus 100 to the chatting service counterparts of terminal apparatuses 100-1, 100-2, . . . , 100-n, and provide a chatting service between the users of the terminal apparatus 100 and the terminal apparatuses 100-1, 100-2, . . . , 100-n.

Meanwhile, the controller 130 may control such that at least one application execution screen that is shared with the chatting service counterparts of terminal apparatuses 100-1, 100-2, . . . , 100-n is displayed on the chatting screen.

In this case, when a predetermined event occurs, the controller 130 may display an application execution screen. For example, when one of the application execution screen selecting menus provided on the chatting screen is selected, the controller 130 may display an application execution screen corresponding to the selected item on one area of the chatting screen.

See FIGS. 3A to 4D for a more detailed explanation. For convenience of explanation, hereinafter is explanation on the case where the terminal apparatus 100 is embodied as a mobile phone.

Figure 3A:
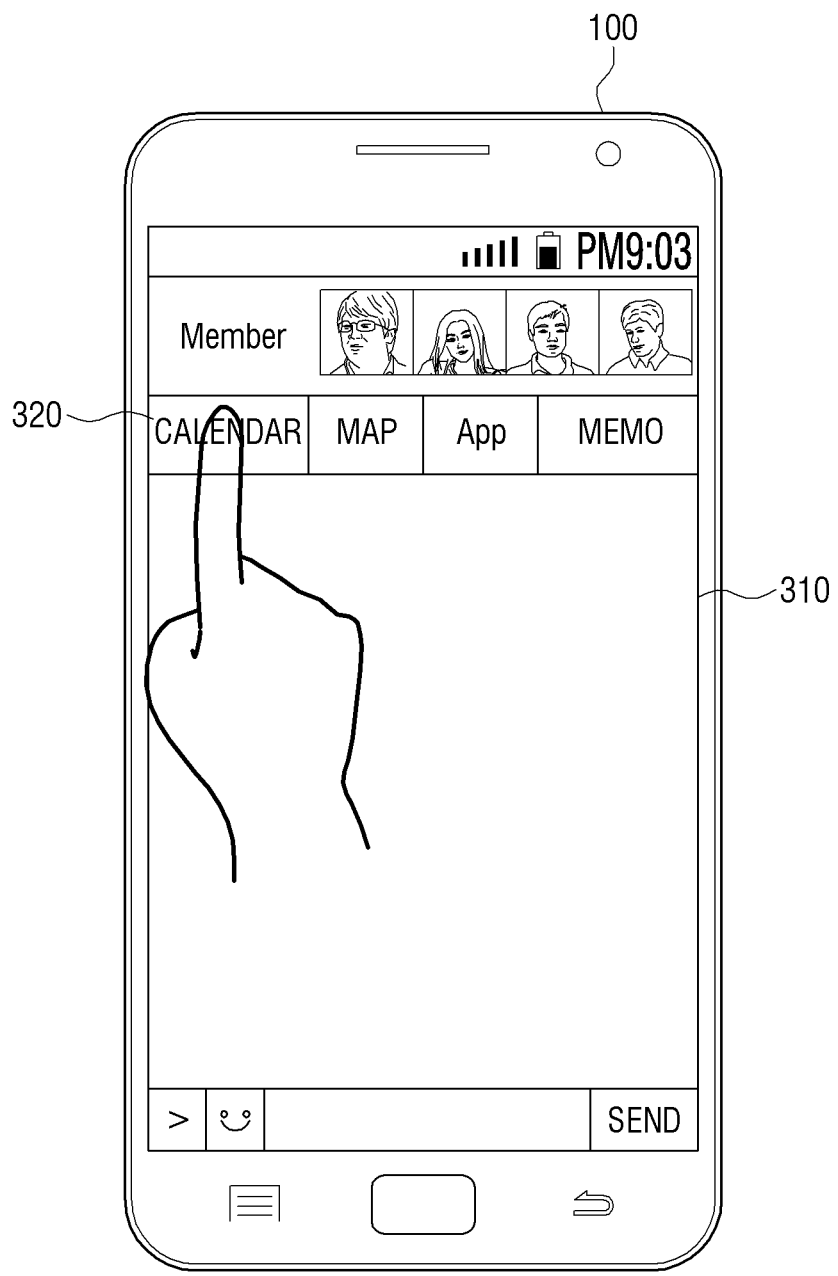
FIGS. 3A and 3B illustrate views for explaining a method for displaying an application execution screen according to an exemplary embodiment.
Figure 3B:
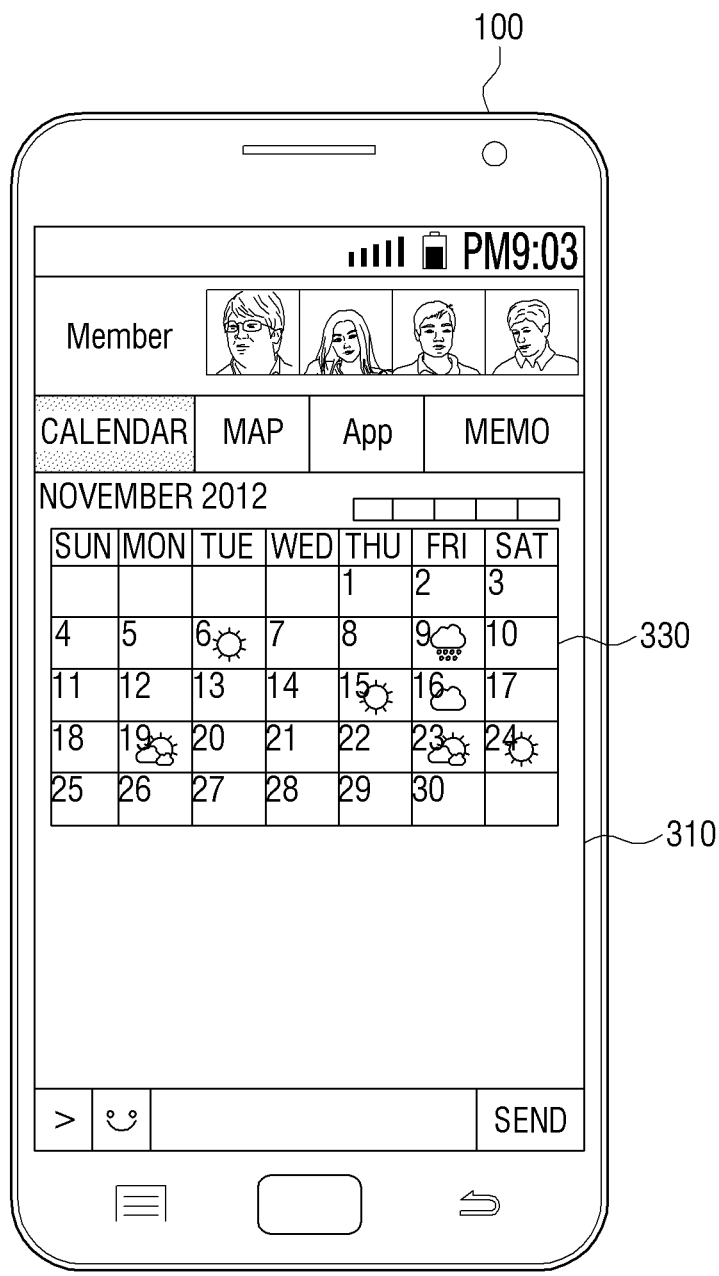

For example, when a "calendar" application is selected from among the application execution selecting menus 320 provided on the chatting screen 310, the controller 130 may display a calendar screen 330 on one area of the chatting screen 310 as illustrated in FIG. 3B.

Meanwhile, in FIG. 3A, it is illustrated that an application execution screen selecting menu 320 is disposed on an upper end of the chatting screen 310. Although one format of the selecting menu 320 is illustrated, exemplary embodiments are not limited to the illustrated format and the format of the application execution screen selecting menu 320 may be changed in various ways.

In addition, the application execution screen selecting menu 320 is illustrated as comprising "calendar", "map", and "memo", but this is also just an example, and thus the application execution screen selecting menu 320 may also be changed in various formats by default in the chatting application itself or a setting changed by the user.

For example, by default in the chatting application itself, the application execution screen selecting menu may consist of a "calendar", "map", and "memo", and then the user may change the set value such that the application execution screen selecting menu consists of "calendar", "map", "app", and "memo".

In this case, the controller 130 may configure and display each application execution screen differently.

For example, when a calendar screen is displayed, the controller 130 may display a calendar comprising a date set as default, a date preset by the user, or the current date, on the application execution screen. Otherwise, the controller 130 may display the calendar which was most recently displayed on the application execution screen.

In addition, when a map screen is displayed, the controller 130 may display a map of an area set as default, an area selected by the user, or an area where the terminal apparatus 100 is currently located on the application execution screen. In addition, the controller may display the most recently displayed map on the application execution screen.

In addition, when an application download screen is displayed, the controller 130 may display a blank screen, or an application download screen regarding the application set as a default on the application execution screen. In addition, the controller 130 may display an application download screen that was most recently connected or most recently downloaded on the application execution screen.

In addition, when a memo screen is displayed, the controller 130 may display a memo set as default on the application execution screen. Furthermore, the controller 130 may display the most recently written and stored memo on the application execution screen.

Meanwhile, when the application execution screen is displayed, the controller 130 may control the communicator 110 such that the displayed application execution screen is shared with the chatting service counterparts of terminal apparatuses 100-1, 100-2, . . . , 100-n.

More specifically, when the application execution screen is displayed, the controller 130 may control such that the data on the application execution screen displayed for sharing the displayed application execution screen with the chatting service counterpart is transmitted to the server 200.

In this case, the controller 130 may transmit the data on the application execution screen to the server 200 at the point where the application execution screen is displayed on one area of the chatting screen. However, this is just an example, and the controller 130 may transmit the data on the application execution screen to the server 200 when an additional user command is input.

Herein, the data on the application execution screen may comprise various information according to the type of the application execution screen.

For example, in the case of a map screen, the data may be the title of the area, GPS information, and scale information etc. necessary for displaying the map screen that is currently being displayed, while in the case of a calendar screen, the data may be information on the date when the calendar screen is currently being displayed. In addition, in the case of an application download screen, the data may be address information (for example, URL information) of the application download screen that is currently being displayed. Furthermore, in the case of a memo screen, the data may be information on the text or image etc. included in the memo that is currently being displayed.

Meanwhile, the server 200 may transmit the data received from the terminal apparatus 100 to the chatting service counterparts of the terminal apparatuses 100-1, 100-2, . . . , 100-n. In this case, the server 200 may additionally transmit a separate command for executing a chatting application to the terminal apparatuses 100-1, 100-2, . . . , 100-n.

Accordingly, the terminal apparatuses 100-1, 100-2, . . . , 100-n may execute a chatting application and use the data received from the server 200 to display on one area of the chatting screen an application execution screen that is identical to the application execution screen displayed on the terminal apparatus 100.

For example, in the case where a map screen is displayed on the terminal apparatus 100, the terminal apparatuses 100-1, 100-2, . . . , 100-n may use the area name, GPS information, and scale information etc. received from the server 200 to configure a map screen that is identical to the map screen being displayed on the terminal apparatus 100, and display the configured map screen on an area of the chatting screen. In this case, the terminal apparatuses 100-1, 100-2, . . . , 100-n may execute a sub function provided in the chatting application itself, or execute another application additionally, and then interlock it with the chatting application to display the application execution screen.

Meanwhile, in the case of the latter, the server 200 may either transmit a command for executing an application being interlocked with the chatting application to the terminal apparatuses 100-1, 100-2, . . . , 100-n, or the terminal apparatuses 100-1, 100-2, . . . , 100-n themselves may analyze the data received from the server 200 and determine the application that must be executed to display the application execution screen.

Meanwhile, the controller 130 may control the communicator 110 to share the function executed according to the user manipulation regarding the application execution screen with the chatting service counterparts of the terminal apparatuses 100-1, 100-2, . . . , 100-n.

In this case, the function executed according to the user's manipulation may be in various formats according to the type of the application execution screen.

First, hereinafter is an explanation on a case based on an assumption where a map or calendar is displayed on an application execution screen.

In this case, the controller 130 may control such that the application execution screen where a GUI (Graphic User Interface) corresponding to the user's manipulation is displayed is shared with the chatting service counterparts of the terminal apparatuses 100-1, 100-2, . . . , 100-*n*.

More specifically, in the case where the application execution screen is a map screen, the controller 130 may control to display the GUI on the point selected according to the user's manipulation and to share the map screen where the GUI is displayed with the chatting service counterparts of the terminal apparatuses 100-1, 100-2, . . . , 100-*n*.

That is, when a user's manipulation of touching the map screen is input, the controller 130 may display the GUI for identifying the point selected by the user with other points. For example, the GUI may be one of various types of GUIs such as a circle, line, certain icon etc. that may show that the user selected the corresponding point.

In addition, the controller 130 may transmit the information on the GUI format and the information on the point where the GUI is displayed on the map screen (for example, information on the coordinates, area, and GPS etc.) to the server 200. In this case, the server 200 may transmit the data received from the terminal apparatus 100 to the terminal apparatuses 100-1, 100-2, . . . , 100-*n*. Accordingly, in the terminal apparatuses 100-1, 100-2, . . . , 100-*n*, it is possible to display the GUI on a particular point on the map screen that is currently displayed using the received data. That is, the terminal apparatuses 100-1, 100-2, . . . , 100-*n* may display the map screen where the GUI is displayed on the particular point selected by the user of the terminal apparatus 100.

Meanwhile, in the case where the application execution screen is a calendar screen, the controller 130 may control to display the GUI at the date selected on the calendar screen according to the user's manipulation and to share the calendar screen where the GUI is displayed with the chatting service counterparts of the terminal apparatuses 100-1, 100-2, . . . , 100-*n*.

More specifically, when a user's manipulation of touching the calendar screen is input, the controller 130 may display the GUI for identifying the touched date, that is the date selected by the user from other dates. In this case, the GUI may be one of various types such as a circle, line, and a particular icon etc., or a GUI representing the weather (for example, sun, cloud, rain etc.).

In addition, the controller 130 may transmit data including information on the GUI format and information on the date where the GUI is displayed on the calendar screen to the server 200. In this case, the server 200 may transmit the data received from the terminal apparatus 100 to the chatting service counterparts of the terminal apparatuses 100-1, 100-2, . . . , 100-*n*. Accordingly, in the terminal apparatuses 100-1, 100-2, . . . , 100-*n*, it is possible to display the GUI at a particular date on the calendar screen that is currently displayed using the received data. That is, the terminal apparatuses 100-1, 100-2, . . . , 100-*n* may display the calendar screen where the GUI is displayed at the particular date selected by the user of the terminal apparatus 100.

Meanwhile, in the aforementioned example, it was explained such that the GUI is displayed on the calendar screen, and this being shared with the chatting counterpart, but this is just an example.

That is, in the case where the application execution screen is a calendar screen, the controller 130 may control such that a schedule is added to a date selected according to the user's manipulation on the calendar screen, and that the added schedule information is shared with the chatting service counterparts of the terminal apparatuses 100-1, 100-2, . . . , 100-*n*.

More specifically, when a user manipulation of touching a calendar screen is input, the controller 130 may display a virtual keyboard to receive an input of a schedule regarding the touched date. In this case, the controller 130 may display the schedule input by the user on the calendar screen.

Furthermore, the controller 130 may transmit data on the information on the date where a schedule has been added and on the schedule input to the corresponding date to the server 200. In this case, the server 200 may transmit the data received from the terminal apparatus 100 to the chatting service counterparts of the terminal apparatuses 100-1, 100-2, . . . , 100-*n*. Accordingly, in the terminal apparatuses 100-1, 100-2, . . . , 100-*n*, it is possible to add and display the schedule that the user of the terminal apparatus 100 input to the calendar screen using the received data.

Meanwhile, hereinbelow is an explanation on a case based on the assumption that a memo is displayed on the application execution screen. In the case where the application execution screen is a memo screen, the controller 130 may control such that a text input according to the user's manipulation is displayed on the memo screen, and that the text is shared with the chatting service counterparts of the terminal apparatuses 100-1, 100-2, . . . , 100-*n*.

More specifically, when the memo screen is touched, the controller 130 may display a virtual keyboard, and display the text input through the virtual keyboard on the memo screen. In addition, the controller 130 may transmit the information on the text input to the memo to the server 200. In this case, the server 200 may transmit the data received from the terminal apparatus 100 to the terminal apparatuses 100-1, 100-2, . . . , 100-*n*. Accordingly, in the terminal apparatuses 100-1, 100-2, . . . , 100-*n*, it is possible to display a particular text on the memo screen that is currently displayed using the received data. That is, the terminal apparatuses 100-1, 100-2, . . . , 100-*n* may display the memo screen where the text input by the user of the terminal apparatus 100 is displayed.

Lastly, hereinbelow is explanation on a case based on the assumption that an app download screen is displayed on the application execution screen.

The controller 130 may control such that an application download screen connected according to a user's command is displayed, and that the application download screen is shared with the chatting service counterparts of the terminal apparatuses 100-1, 100-2, . . . , 100-*n*.

More specifically, in the case of an application download screen, there may be included a search window for entering a search word for searching an application pre-stored in an application provision server (not illustrated).

When a search word is entered into a search window, the controller 130 may control the communicator 110 to transmit the input search word to the application provision server (not illustrated), and receive a search result. In addition, the controller 130 may use the received search result to display an application download screen that may download the searched application.

In this case, the controller 130 may transmit data including address information regarding the application download screen that is currently displayed (for example URL information) to the server 200. In this case, the server 200 may transmit the received data to the terminal apparatuses 100-1, 100-2, . . . , 100-*n*. Accordingly, in the terminal apparatuses 100-1, 100-2, . . . , 100-*n*, it is possible to update the application download screen or blank screen that is currently displayed on the terminal apparatuses 100-1, 100-2, . . . , 100-*n* using the received data. That is, the terminal apparatuses 100-1, 100-2, . . . , 100-*n* may display the application download screen provided in the address information that the user of the terminal apparatus 100 connected.

Meanwhile, in the aforementioned example, it was explained that a search window is displayed, but this is just an example. That is, the application download screen may include an address window for inputting address information, and the controller 130 may access the address information input into the address window and download the application download screen and display the same.

Meanwhile, hereinabove it was explained that in the aforementioned exemplary embodiments, the controller 130 may control such that a function executed for each application execution screen is shared with the chatting service counterparts of the terminal apparatuses 100-1, 100-2, . . . , 100-n, at a point when a user's manipulation regarding the application execution screen is input.

That is, at a point when a particular point is selected on the calendar screen or map screen, or a display download screen is displayed, or a text is entered into the memo screen, the controller 130 may transmit data corresponding thereto to the server 200, and share the function regarding the application execution screen executed according to a user's manipulation with the terminal apparatuses 100-1, 100-2, . . . , 100-n.

However, this is just an example, and the controller 130 may share the function regarding the application execution screen executed according to a user's manipulation with the terminal apparatuses 100-1, 100-2, . . . , 100-n when a user's command is input.

For example, when a particular date is selected from the calendar screen, the controller 130 may display a GUI on the selected particular date. Next, when the send item provided on the chatting screen is selected, the controller 130 may control such that information on the GUI format and information on the date on the calendar screen where the GUI is displayed is transmitted to the server 200 and shared with the chatting service counterparts of the terminal apparatuses 100-1, 100-2, . . . , 100-n.

Meanwhile, the controller 130 may display the data received from the server 200 on the application execution screen that is shared with the chatting service counterparts.

More specifically, when data is received from the server 200, the controller 130 may execute the chatting application, and use the data received from the server 200 to display on an area of the chatting screen an application execution screen identical to the application execution screen displayed on the terminal apparatuses 100-1, 100-2, . . . , 100-n.

For example, with a map screen displayed, when data including information on the format of the GUI and the point where the GUI is displayed is received from the server 200, the controller 130 may use the received data to determine the point selected by the user in the terminal apparatuses 100-1, 100-2, . . . , 100-n, and display a GUI at a corresponding point, the GUI having the same format as the GUI displayed on the terminal apparatuses 100-1, 100-2, . . . , 100-n. Furthermore, when the application execution screen that is shared with the chatting service counterparts is displayed and a user's manipulation of selecting a menu item included in the application execution screen is input, the controller 130 may execute the function corresponding to the user's manipulation of selecting a menu item.

In this case, the controller 130 may control such that the address corresponding to the menu item is accessed and an application is downloaded.

That is, in the case of an application download screen, there may be included a menu item for downloading applications provided via the corresponding screen. Accordingly, when a menu item is selected with the application download screen that is shared with the chatting service counterparts being displayed, the controller 130 may access the application provision server (not illustrated) via the internet address mapped to the menu item, download an application, and install the downloaded application in the terminal apparatus 100.

Meanwhile, the controller 130 may control such that the chatting content entered in the chatting screen may be shared with the chatting service counterparts of the terminal apparatuses 100-1, 100-2, . . . , 100-n.

More specifically, when a chatting content is entered in the input window provided on the chatting screen and then the send item is selected, the controller 130 may display the chatting content on the contents display area of the chatting screen, and transmit data on a text or image corresponding to the chatting content to the server 200. In this case, the server 200 may transmit the data received from the terminal apparatus 100 to the terminal apparatuses 100-1, 100-2, . . . , 100-n, and the terminal apparatuses 100-1, 100-2, . . . , 100-n may use the received data to display a chatting screen including the chatting content that was input in the terminal apparatus 100. In this case, the terminal apparatuses 100-1, 100-2, . . . , 100-n may continue displaying the application execution screen on an area of the chatting screen, and use the data on the chatting content received to display on the contents display area the chatting content that the user of the terminal apparatus 100 entered.

Furthermore, when a new chatting content is input, or a new chatting content is received from the terminal apparatuses 100-1, 100-2, . . . , 100-n of the chatting counterparts, the controller 130 may display the new chatting content on the chatting screen.

More specifically, the controller 130 may update the contents display area, and display a new chatting content underneath the chatting content which had been displayed on the contents display area. Herein, in the case where there is more chatting contents than the size of the contents display area, the controller 130 may gradually remove the existing chatting content upwards so as to display new chatting contents.

Meanwhile, the controller 130 may display on an area of the chatting screen the chatting content selected according to a predetermined user's manipulation of among the chatting contents entered in the chatting screen. Herein, the predetermined user's manipulation may be a manipulation of touching the chatting content displayed on the contents display area for or more than a predetermined time.

For example, of among the chatting contents displayed on contents display area provided on the chatting screen, the controller 130 may affix the chatting content of which a touch manipulation has been input for or more than the predetermined time to the top end of the contents display area and display the same. Accordingly, even if a new chatting content is entered or received from the terminal apparatuses 100-1, 100-2, . . . , 100-n of the chatting counterparts and is displayed on the contents display area, the chatting content of which a touch manipulation has been input for or more than the predetermined time may not be removed from the contents display area and continue to be displayed on one area of the chatting screen In this case, the controller 130 may display a selecting item regarding the application execution screen related to the selected chatting content together with the selected chatting content. Herein, the application execution screen related to the selected chatting content may be an application execution screen for instructing the selected chatting content.

For example, in the case of a map screen, it may be a map screen where a corresponding point related to the chatting content mentioning a particular point is displayed so as to be differentiated from other points. Likewise, in the case of a calendar screen, it may be a calendar screen where a corresponding date related to the chatting content mentioning a particular date is displayed so as to be differentiated from other dates. In addition, in the case of a memo screen, it may be a memo screen that includes contents related to the chatting content.

By another example, in the case of an application download screen, it may be an application download screen where an application related to the chatting content may be downloaded.

Meanwhile, an application execution screen related to the selected chatting content may be determined in various methods.

For example, in the case where a chatting content is entered within a predetermined time before or after the point where the application execution screen is shared with the terminal apparatuses 100-1, 100-2, . . . , 100-n or an application execution screen is shared within a predetermined time before or after the point when chatting content has been entered and transmitted to the terminal apparatuses 100-1, 100-2, . . . , 100-n, the controller 130 may determine that the shared application execution screen is related to the corresponding chatting content.

For example, assuming that a user entered a chatting content "let's meet here" in the input window, and then selected a particular point on the map screen within a predetermined time, and thus a map screen where the particular point is selected is shared, the controller 130 may determine that the shared map screen, that is the map screen where the point that the user selected is displayed so as to be differentiated from other points is an application execution screen related to the chatting content "let's meet here".

Furthermore, assuming that the user searched an application to be downloaded and shared an application download screen, and the chatting content "it is this app" is entered within a predetermined time, the controller 130 may determine that the shared application download screen is an application execution screen related to the chatting contents "it is this app".

Meanwhile, even when the send item is selected and the application execution screen is shared, the controller 130 may determine that the application execution screen is an application execution screen related to the chatting content in a similar method as the aforementioned.

Meanwhile, when a selecting item is selected, the controller 130 may display an application execution screen related to the selected chatting content. In this case, the controller 130 may display the application execution screen related to the selected chatting content in a full screen format.

In addition, the controller 130 may control so that data including information on the selected chatting contents and the application execution screen related to the selected chatting content to the server 200 is transmitted to the server 200 and is shared with the chatting service counterparts of the terminal apparatuses 100-1, 100-2, . . . , 100-n.

That is, when a user's manipulation of selecting a chatting content for or more than a predetermined time is input, the controller 130 may transmit data including information on the selected chatting content and the application execution screen related to the selected chatting content to the server 200.

Herein, information on the selected chatting content may include information on the time when the chatting content was entered, the user who entered the chatting content, and a text or image included in the chatting content.

Furthermore, information related to the application execution screen related to the selected chatting content may include various information according to the type of the application execution screen. For example, in the case of a map screen, information related to the application execution screen related to the selected chatting content may include information on the type of GUI displayed on the point that the user selected, coordinates of the point where the GUI is displayed, and GPS information etc.

In this case, the server 200 may transmit the received data to the terminal apparatuses 100-1, 100-2, . . . , 100-n. Accordingly, the terminal apparatuses 100-1, 100-2, . . . , 100-n may use the received data to arrange and display the selected chatting content and selecting item on a top end of the contents display area, and when a selecting item is selected, the terminal apparatuses 100-1, 100-2, . . . , 100-n may display the application execution screen related to the chatting contents.

Meanwhile, the controller 130 may control so that each application execution screen related to the selected chatting content is scrapped and stored.

More specifically, the controller 130 may capture and store the application execution screen related to the selected chatting content, and capture and store the application execution screen related to the next selected chatting content, thereby scrapping the application execution screen related to each of the selected chatting content. In this case, the controller 130 may store the captured screen in a storage (not illustrated) provided in the terminal apparatus 100 or in the server 200.

For example, when a predetermined user's manipulation is input, the controller 130 may display the scrapped application execution screen. In this case, the controller 130 may display an application execution screen scrapped as having the selected chatting content as the title of each application execution screen.

For example, assuming a case where a map screen 1 related to "let's meet here" is scrapped, and a map screen 2 related to "let's eat dinner here after riding the bicycle" are scrapped, the controller 130 may generate a scrap screen consisting of the map screen 1 and map screen 2, and when a flick manipulation from the right to left direction is input, the controller 130 may newly display a scrap screen in the direction the flick manipulation has been input. In this case, on each map screen, a chatting content may be displayed together. That is, "let's meet here" may be added to the map screen 1 and "let's eat dinner here after riding the bicycle" may be added to the map screen 2, and then the map screen 1 and the map screen 2 may be displayed.

Meanwhile, the controller 130 may store a function regarding the application execution screen executed according to a user's manipulation in an application corresponding to each application execution screen. In this case, in the case where a user's manipulation is input on the application execution screen, or where a user's manipulation is input on the application execution screen and then a chatting application is ended, the controller 130 may store data on various information that has been input in the application execution screen according to the user's manipulation per application.

In this case, the data stored in each application may include various information according to the type of application.

For example, when a map screen is being shared, the controller 130 may store in a map application installed in the terminal apparatus 100 the data including the type of the GUI input in the map screen by the user or chatting counterparts, and on the location of the point where the GUI is displayed.

Furthermore, when a calendar screen is being shared, the controller 130 may store in a calendar application installed in the terminal apparatus 100 the data including the type of the GUI input in the map screen by the user or chatting counterparts, the date when the corresponding GUI was displayed, schedule information, and information on the date when the corresponding schedule was entered.

Furthermore, when an application download screen is being shared, the controller 130 may store in an application download application installed in the terminal apparatus 100 the data including address information on the application download screen which was shared by the user or chatting counterparts.

In addition, when a memo screen is being shared, the controller 130 may store in a memo application installed in the terminal apparatus 100 the information on a text or image which was entered in the memo screen by the user or chatting counterparts.

Furthermore, the controller 130 may control such that, when an application is executed, the application execution screen that was shared with the terminal 100-1, 100-2, . . . , 100-n is displayed using pre-stored data.

For example, in the case where the user execute a map application, the controller 130 may display a map screen where the GUI is displayed at the same point as the point that the user or chatting counterparts selected during chatting. That is, the controller 130 may display the map screen that was shared with the chatting counterparts via the previous chatting screen.

Accordingly, the user is able to receive the application execution screen that was shared during chatting through separate applications.

Meanwhile, the controller 130 may store the function regarding the application execution screen executed according to the user's manipulation in an integrated application. Herein, the integrated application may be an application that manages the user's schedule etc. in an integrated manner.

In this case, the controller 130 may synchronize the integrated application with each application, and store data on the application execution screen stored per application in the integrated application.

For example, assuming that information on the schedule content input in a particular date and on the date for which the corresponding schedule was input is pre-stored in a calendar application, and that information on the type of the GUI, the point where the GUI is displayed, and the date when the map screen was shared is presorted in a map application, the controller may use the information pre-stored in each application to update the schedule provided in the integrated application in an integrated manner.

More specifically, the controller 130 may use the information stored in the calendar application to store schedule information in a particular date of the schedule provided in the integrated application, and use the information stored in the map application to store the map screen where a GUI was displayed on a particular point.

Accordingly, the user may be provided with schedule information that used to be provided through the calendar application and the map screen that used to be provided through the map application through the integrated application at the same time.

Meanwhile, it was explained in the aforementioned example, that in order to manage the user's schedule in the integrated application, each application is synchronized in the integrated application, but this is just an example. That is, the controller 130 may obviously store the various information that had been input in the application execution screen during chatting directly in the integrated application.

Meanwhile, hereinbelow is a detailed explanation with reference to FIGS. 4A to 7F.

FIGS. 4A to 7F are views for explaining a method for sharing an application execution screen according to an exemplary embodiment.

Specifically, FIGS. 4A to 4D illustrate views for explaining a method for sharing a map screen.

Figure 4A:
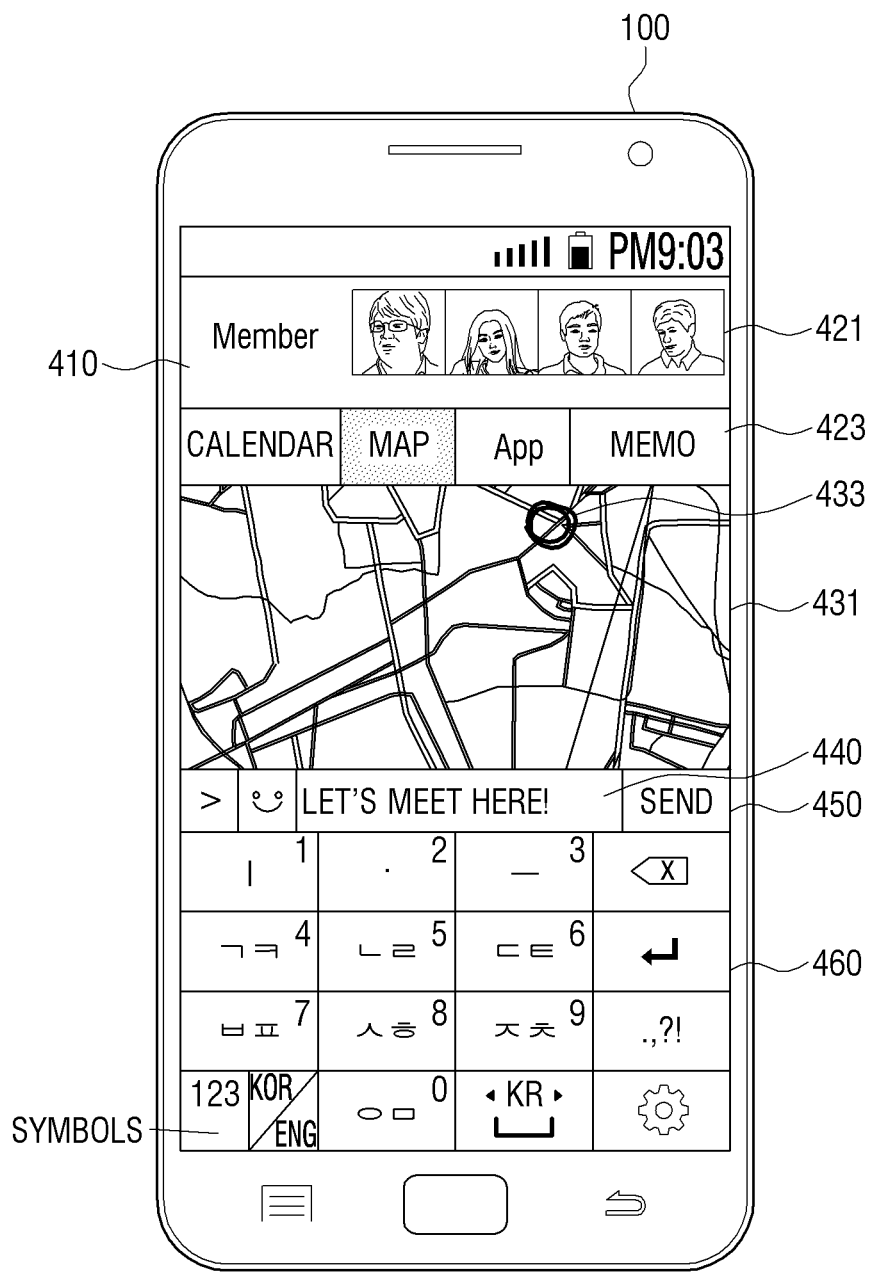
FIGS. 4A to 6 are views for explaining a method for sharing an application execution screen according to an exemplary embodiment.

First of all, as illustrated in FIG. 4A, information on chatting service counterparts 421, input window 440, and send item 450 may be displayed on the chatting screen 410. Herein, the information on chatting service counterparts 421 may be images of the chatting service counterparts preregistered in the server 200.

Meanwhile, when the input window 440 is selected, a virtual keyboard 460 for receiving an entering of a chatting content may be displayed. Accordingly, when a chatting content is entered through the virtual keyboard 460, the entered chatting content may be displayed on the input window 440. For example, when the user input a chatting content "LET'S MEET HERE!", "LET'S MEET HERE!" may be displayed on the input window 440.

Figure 4B:
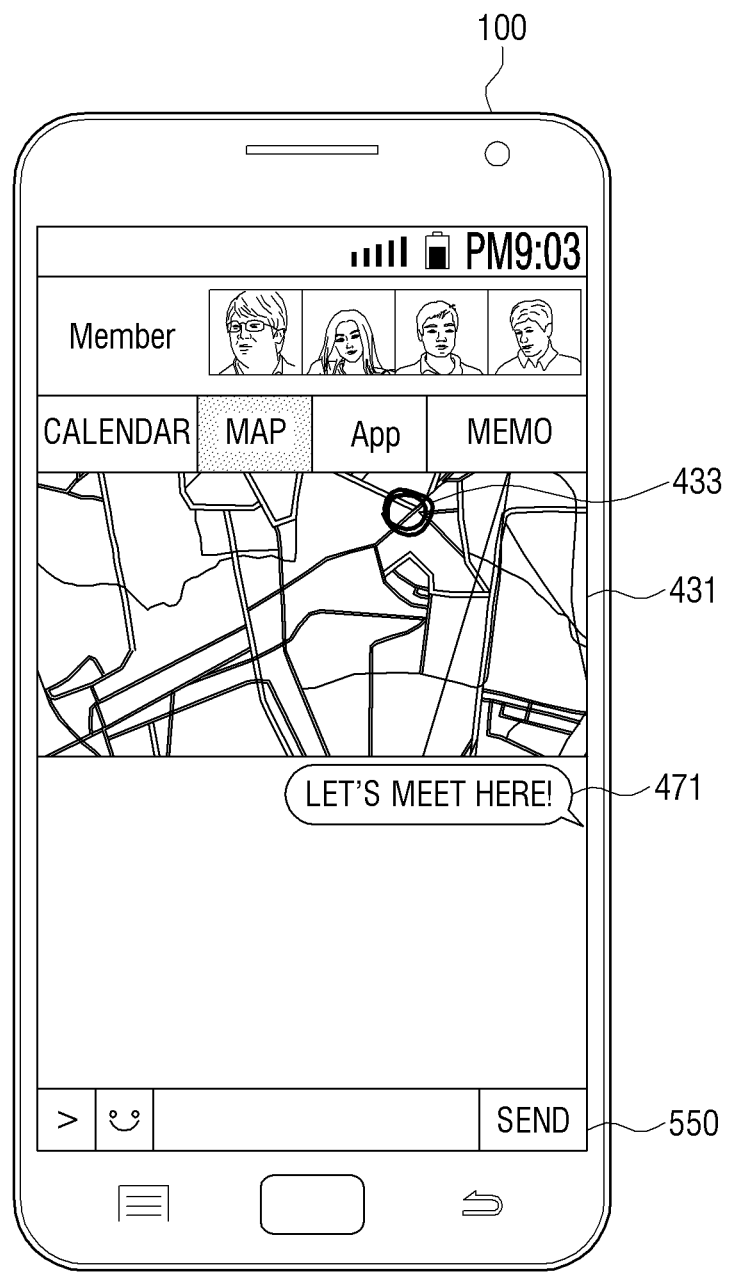

Next, when the send item 450 is selected, the "LET'S MEET HERE!" which has been input may be transmitted to the chatting service counterparts of the terminal apparatuses 100-1, 100-2, . . . , 100-n, and the chatting content "LET'S MEET HERE!" 471 may be displayed on the contents display area as illustrated in FIG. 4B.

Meanwhile, as illustrated in FIG. 4A, on the chatting screen 410, an application execution screen selecting menu 423 may be displayed. In this case, when "map" is selected through the application execution screen selecting menu 423, a map screen 431 may be displayed on one area of the chatting screen.

Next, when a particular point is selected by the user on the map screen 431, a GUI 433 may be displayed on the selected point, as illustrated in FIG. 4A. In this case, the type and color of the GUI displayed may be determined by the user.

Furthermore, the map screen 431 where the GUI 433 is displayed on the point selected by the user may be shared with the chatting service counterparts.

Meanwhile, in the case where the chatting service counterparts entered a chatting content through their terminal apparatuses 100-1, 100-2, . . . , 100-n, the terminal apparatus 100 may receive from the server 200 the chatting content that the chatting service counterparts entered.

Figure 4C:
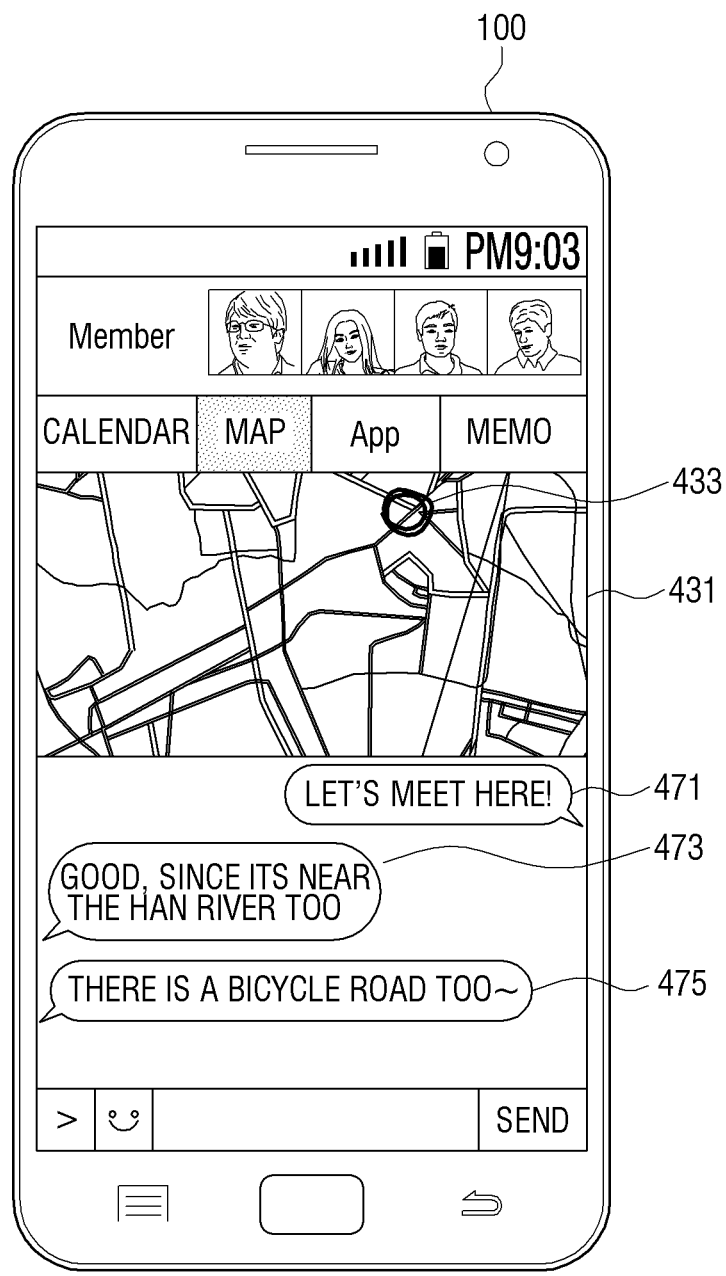
Figure 4D:
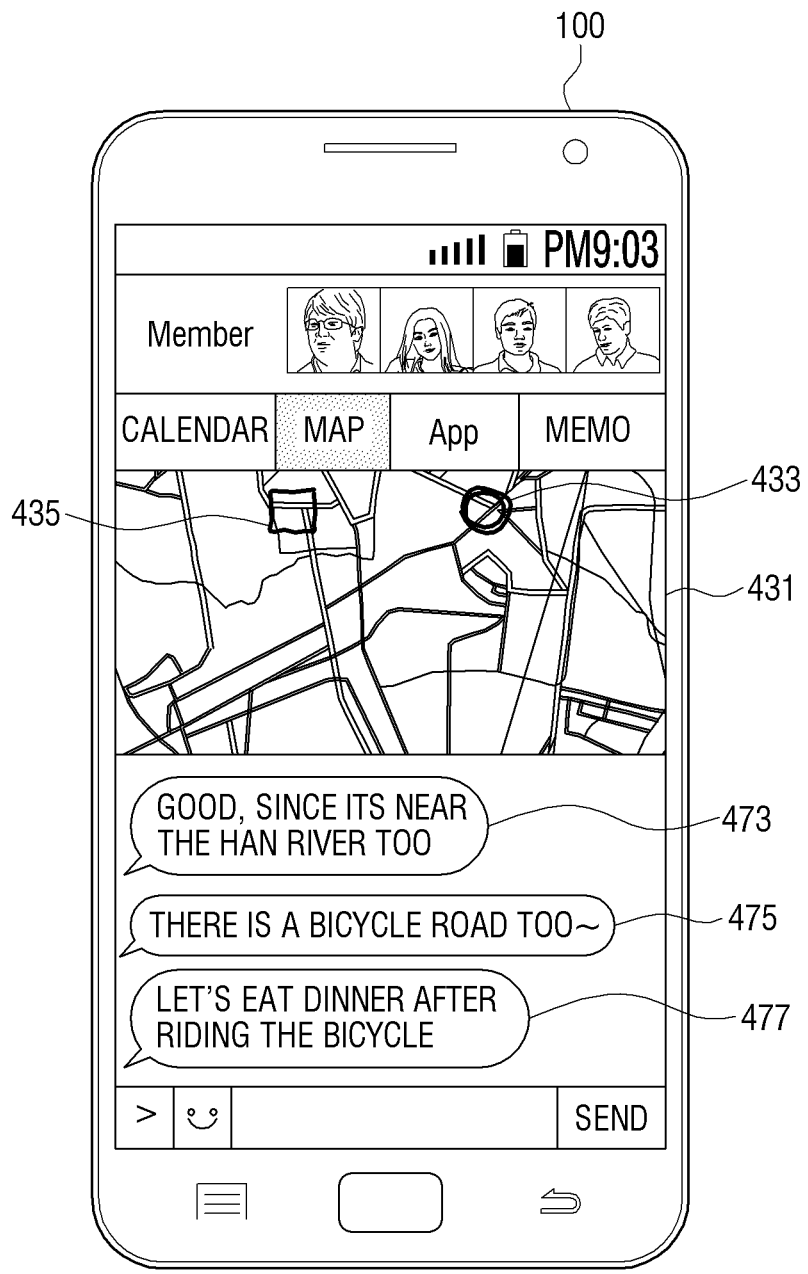

In this case, the chatting contents may be aligned in the contents display area in the order they were entered. For example, as illustrated in FIG. 4C and FIG. 4D, the chatting contents that the chatting service counterparts entered, that is "GOOD, SINCE ITS NEAR THE HAN RIVER TOO" 473, "THERE IS A BICYCLE ROAD TOO~" 475, and "LET'S EAT DINNER AFTER RIDING THE BICYCLE" 477 may be displayed on the contents display area consecutively.

In addition, in the case where the chatting service counterparts select a particular point on the map screen displayed on their terminal apparatuses 100-1, 100-2, . . . , 100-n, data for displaying a GUI on a point selected on the map screen may be received from the server 200. In this case, the terminal apparatus 100 may use the data received as illustrated in FIG. 4D to display the GUI 435 at the point where the chatting service counterparts selected on the map screen 431.

In such a method, the user may share in real time not only the chatting contents but also the application execution screen for receiving the information related to the chatting contents.

However, this is just an example, and thus various application execution screens may obviously be shared.

Figure 5:
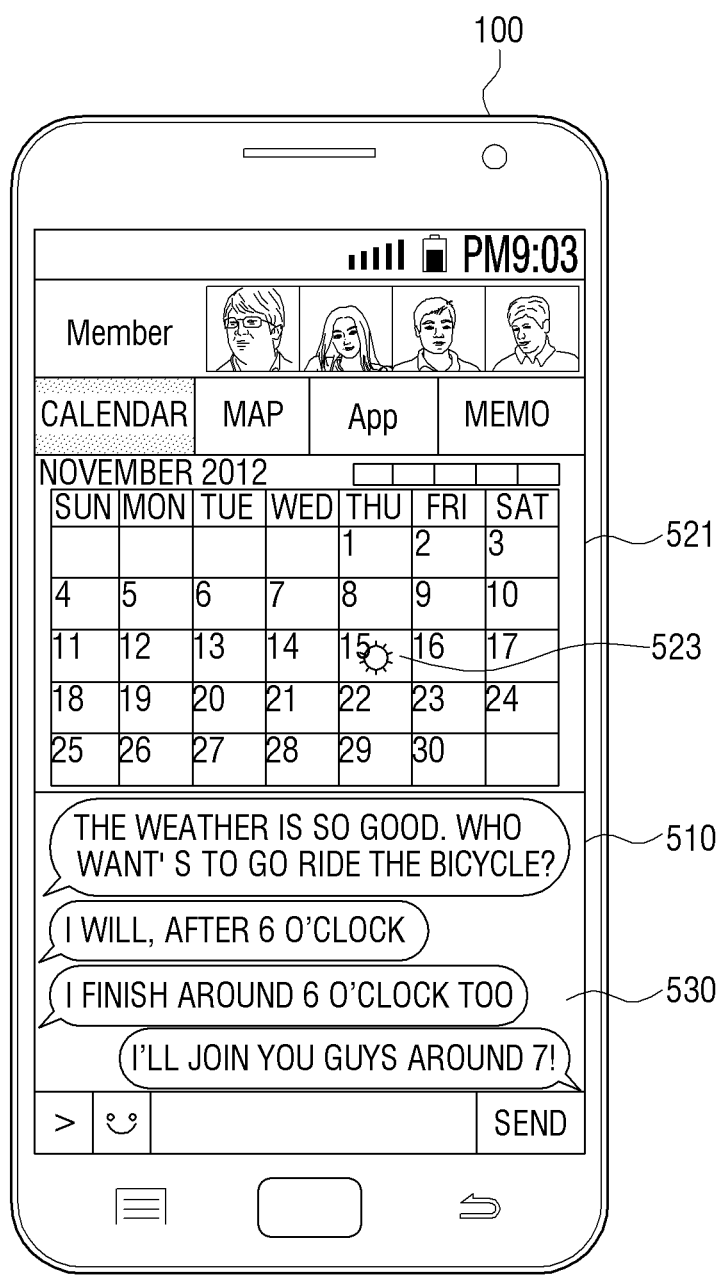
Figure 6:
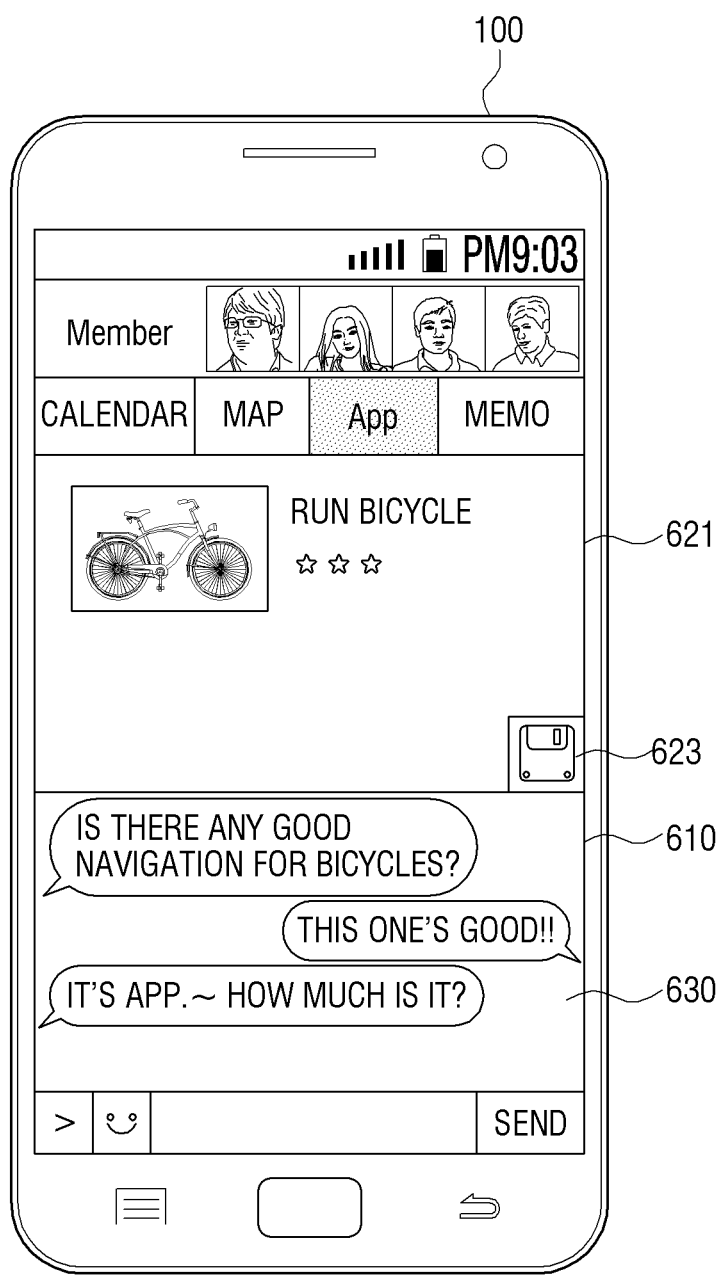

For example, as illustrated in FIG. 5, the calendar screen 521 may be shared, or as illustrated in FIG. 6, an application download screen 621 may be shared.

First, in the case of sharing a calendar screen with the chatting service counterparts of the terminal apparatuses 100-1, 100-2, . . . , 100-n, as in FIG. 5, a calendar screen 521 may be displayed on one area of the chatting screen 510. In this case, on a particular date of the calendar screen 521, a GUI 523 may be displayed on the point selected by the user or the chatting service counterparts. In addition, as illustrated in FIG. 5, the chatting content that the user and the chatting service counterparts input may be displayed on the contents display area 530.

Meanwhile, in the case of sharing the application download screen with the chatting service counterparts of the terminal apparatuses 100-1, 100-2, . . . , 100-n, as illustrated in FIG. 6, an application download screen 621 may be displayed on the application download screen 621 on one area of the chatting screen 610. In this case, on an app download screen 621, a menu item 623 for receiving an application may be included. Accordingly, in the case where the user selects the menu item 623, the corresponding app may be downloaded from outside and be installed. In addition, as illustrated in FIG. 6, the chatting contents entered by the user and chatting service counterparts may be displayed on the contents display area 630.

FIGS. 7A to 7F illustrate views for explaining a method for affixing a particular chatting content and displaying the same according to an exemplary embodiment.

Figure 7A:
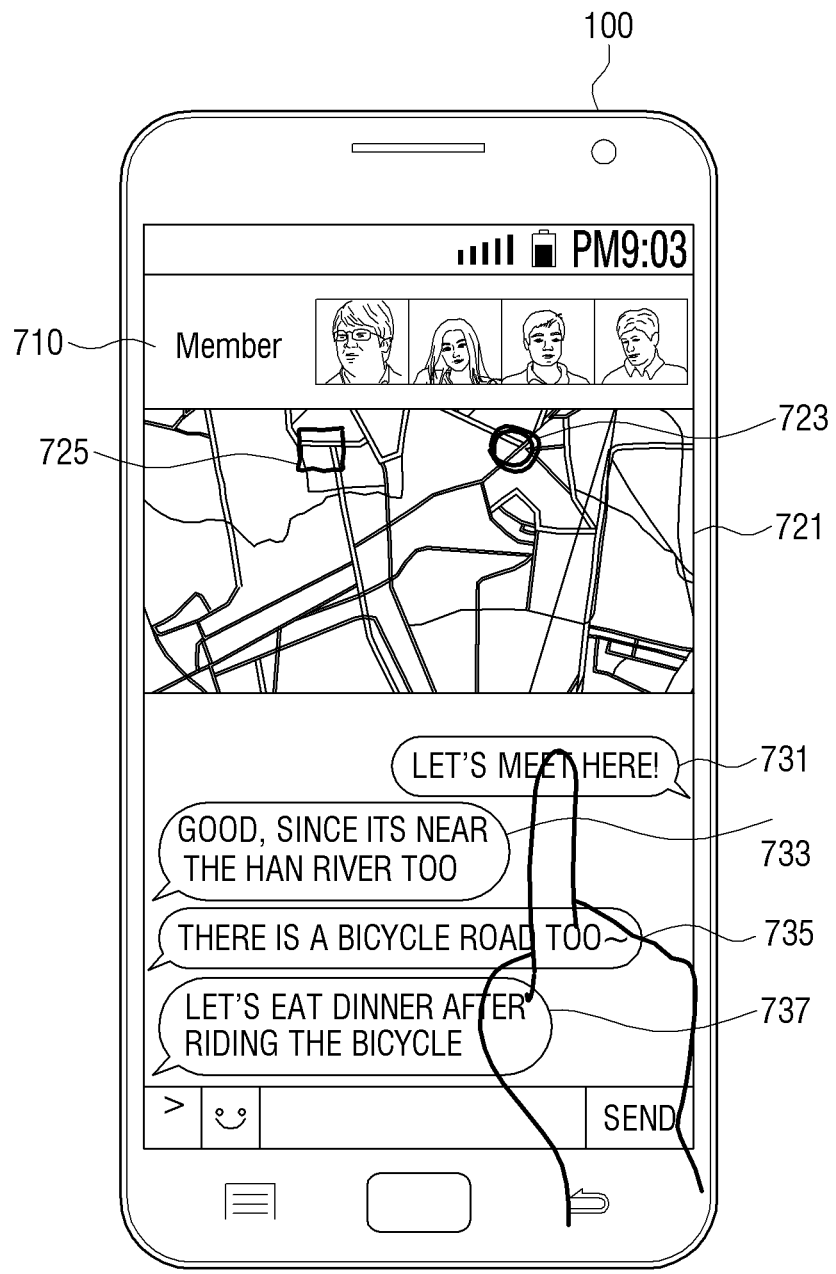
FIGS. 7A to 7F illustrate views for explaining a method for fixating a particular chatting context and displaying the chatting content according to an exemplary embodiment.

First, in the case of sharing a map screen with the chatting service counterparts of the terminal apparatuses 100-1, 100-2, . . . , 100-n, as illustrated in FIG. 7A, on one area of the chatting screen 710, a map screen 721 may be displayed. In this case, on the map screen 710, the GUI 723, 725 may be displayed on each point where the user and chatting service counterparts selected.

Furthermore, on the contents display area provided on the chatting screen 710, the chatting contents each entered by the user and the chatting service counterpart may be displayed. That is, as illustrated in FIG. 7A, the chatting contents "LET'S MEET HERE!" 731 that the user entered and "GOOD, SINCE ITS NEAR THE HAN RIVER TOO" 733 and "THERE IS A BICYCLE ROAD TOO~" 735, and "LET'S EAT DINNER AFTER RIDING THE BICYCLE" 737 that the chatting service counterparts entered may be displayed.

Figure 7B:
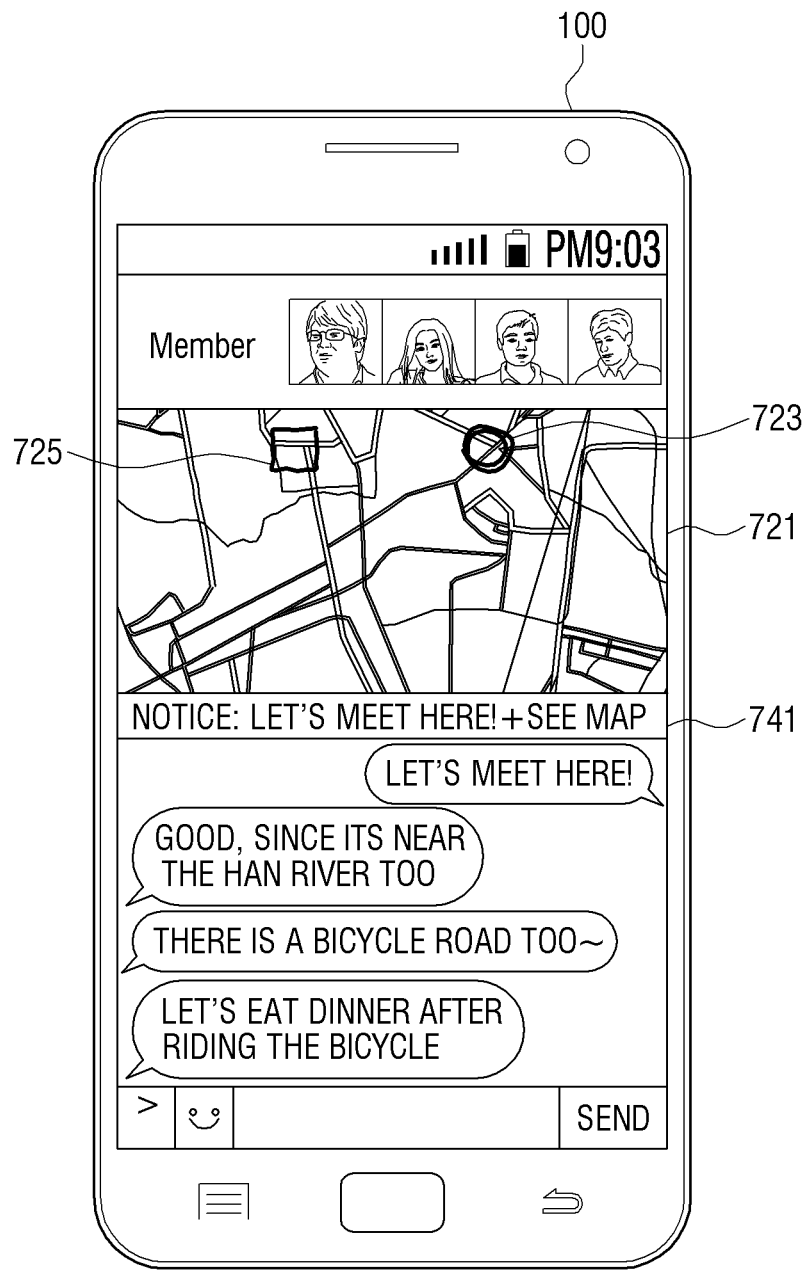

Meanwhile, when the user selects one of the chatting contents displayed on the contents display area for more than a predetermined time, the selected chatting content may be displayed on the top end of the contents display area fixatedly. That is, in the case of touching "LET'S MEET HERE!" 731 for or more than a predetermined time, as illustrated in FIG. 7B, the chatting content "LET'S MEET HERE!" may be displayed on the top end 741 of the contents display area. In this case, the chatting contents "LET'S MEET HERE!" 731 may be displayed on the top end of the contents display area in the chatting service counterparts of the terminal apparatuses 100-1, 100-2, . . . , 100-n as well.

In this case, the chatting content may be displayed together with the menu item for displaying an application execution screen related to the corresponding chatting content. For example, as illustrated in FIG. 7B, the menu item may be displayed such as "SEE MAP".

Figure 7C:
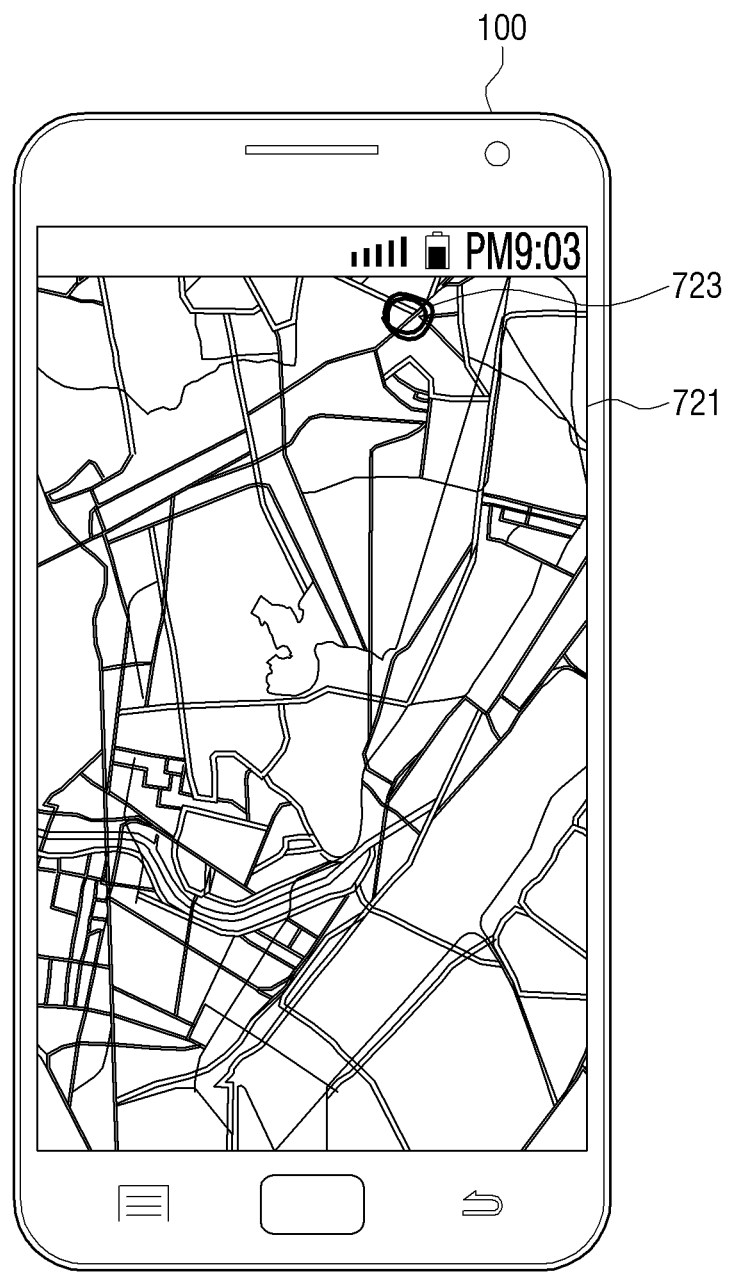

In this case, when the user selects the menu item, the application execution screen related to the chatting content fixated and displayed may be displayed. For example, as illustrated in FIG. 7C, when "SEE MAP" is selected, the map screen 721 related to the chatting content "LET'S MEET HERE!" may be displayed. For example, the map screen 721 may be a map screen where a GUI 723 is displayed on the point that the user selected on the map screen after the user entered "LET'S MEET HERE!", selected a particular point on the map screen within a predetermined time.

Meanwhile, the chatting service counterparts may have a particular chatting contents be displayed on a fixated location on the chatting screen through their terminal apparatuses 100-1, 100-2, . . . , 100-n. This method is the same as that performed in the terminal apparatus 100.

Figure 7D:
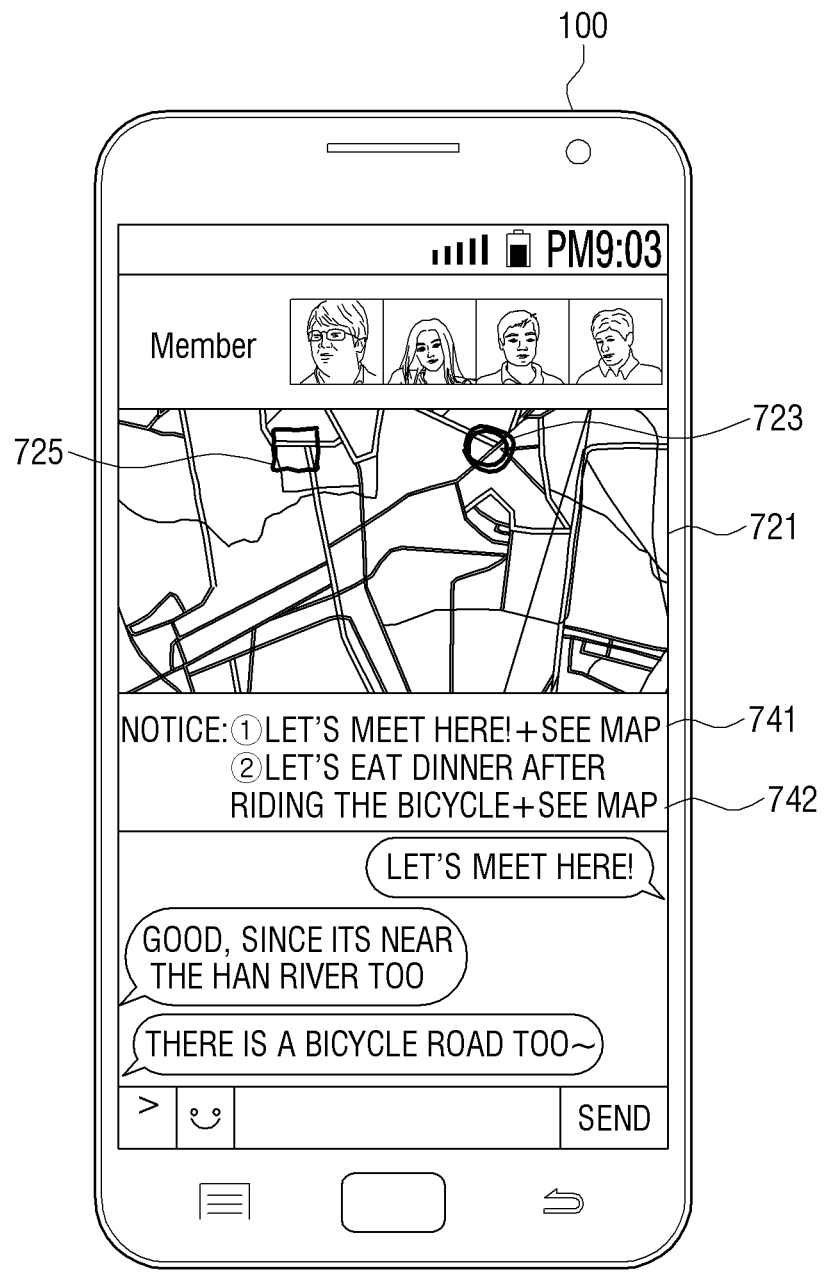

For example, in the case where the chatting service counterparts touched "LET'S EAT DINNER HERE AFTER RIDING THE BICYCLE" 737 for or more than a predetermined time, "LET'S EAT DINNER HERE AFTER RIDING THE BICYCLE" may be displayed on the top end of the contents display area. In this case, as illustrated in FIG. 7D, "LET'S EAT DINNER HERE AFTER RIDING THE BICYCLE" may be arranged underneath the "LET'S MEET HERE!" that was fixated and displayed in the time order.

In this case, the menu item for displaying the application execution screen related to the chatting content may be displayed together. For example, as illustrated in FIG. 7B, the chatting content may be displayed together with "SEE MAP".

Figure 7E:
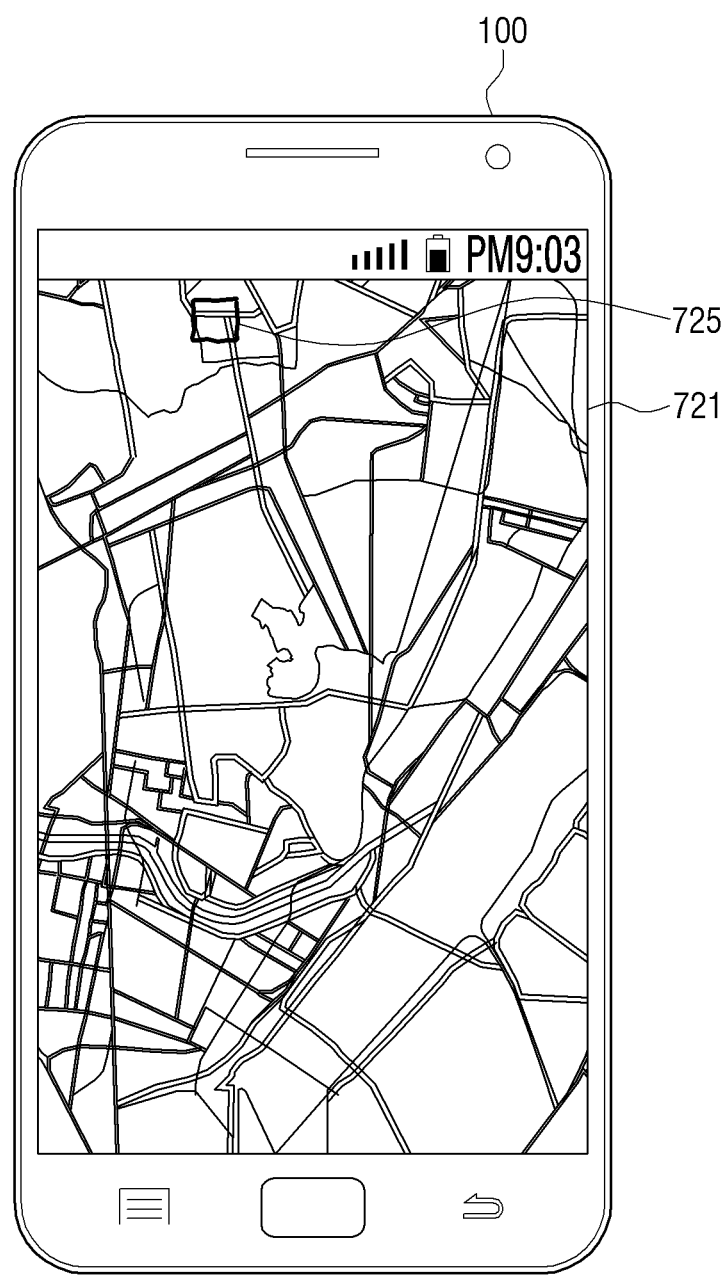

In this case, when the user selects the menu item, the application execution screen related to the chatting contents fixated and displayed may be displayed. For example, when "SEE MAP" is selected, as illustrated in FIG. 7E, the map screen 721 related to the chatting content "LET'S EAT DINNER HERE AFTER RIDING THE BICYCLE" may be displayed. Herein, the map screen 721 may be a map screen where a GUI 725 is displayed on the point that the chatting service counterparts who entered "LET'S EAT DINNER HERE AFTER RIDING THE BICYCLE" selected on the map screen after selecting a particular point on the map screen within a predetermined time.

Figure 7F:
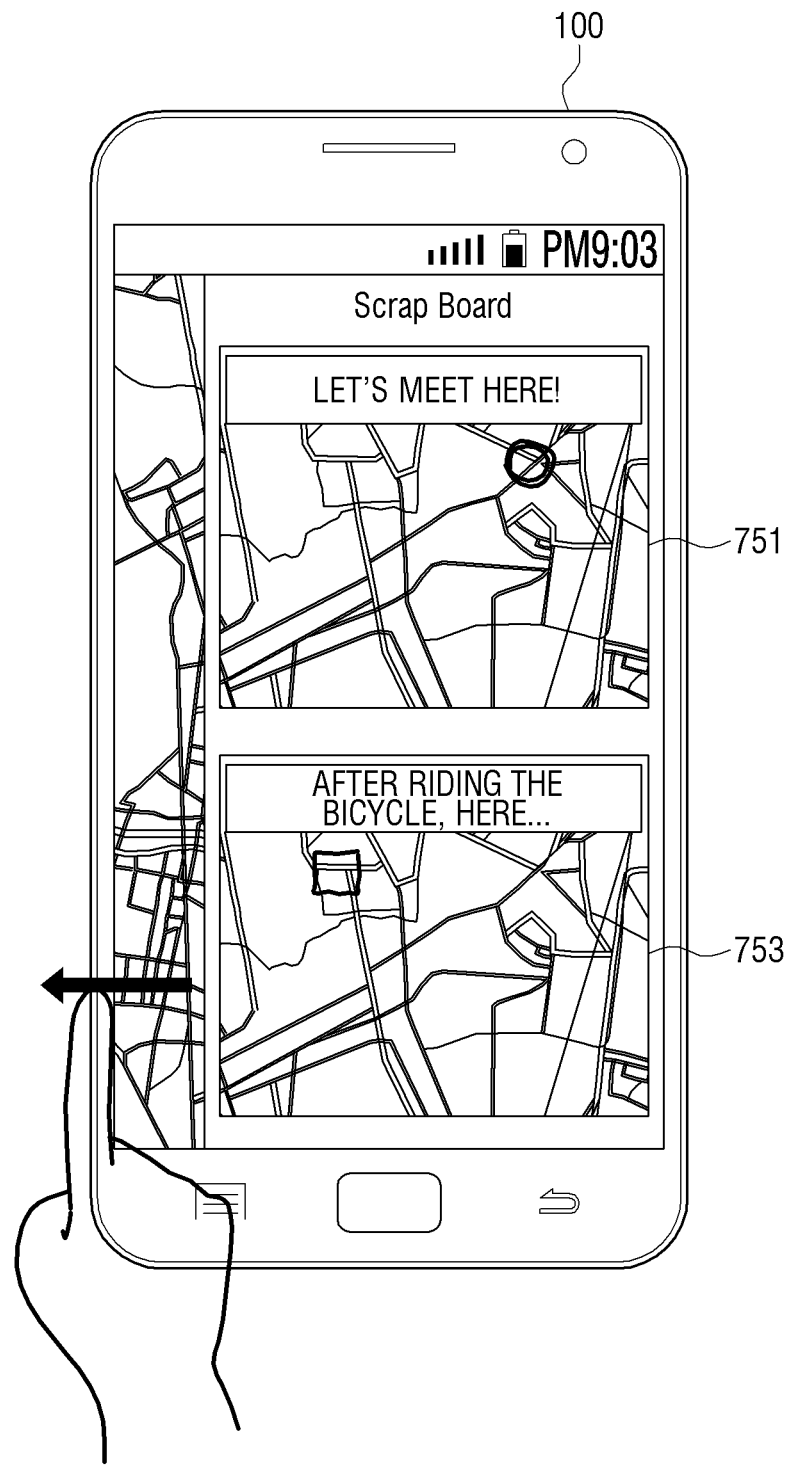

Meanwhile, the selected chatting content and the application execution screen related thereto may be provided through a separate screen. For example, as illustrated in FIG. 7F, when the user inputs a flick manipulation from the right to left, "LET'S MEET HERE!" and the map screen 751 related thereto and "LET'S EAT DINNER HERE AFTER RIDING THE BICYCLE" and the map screen 753 related thereto may be displayed on one scrap board.

Figure 8:
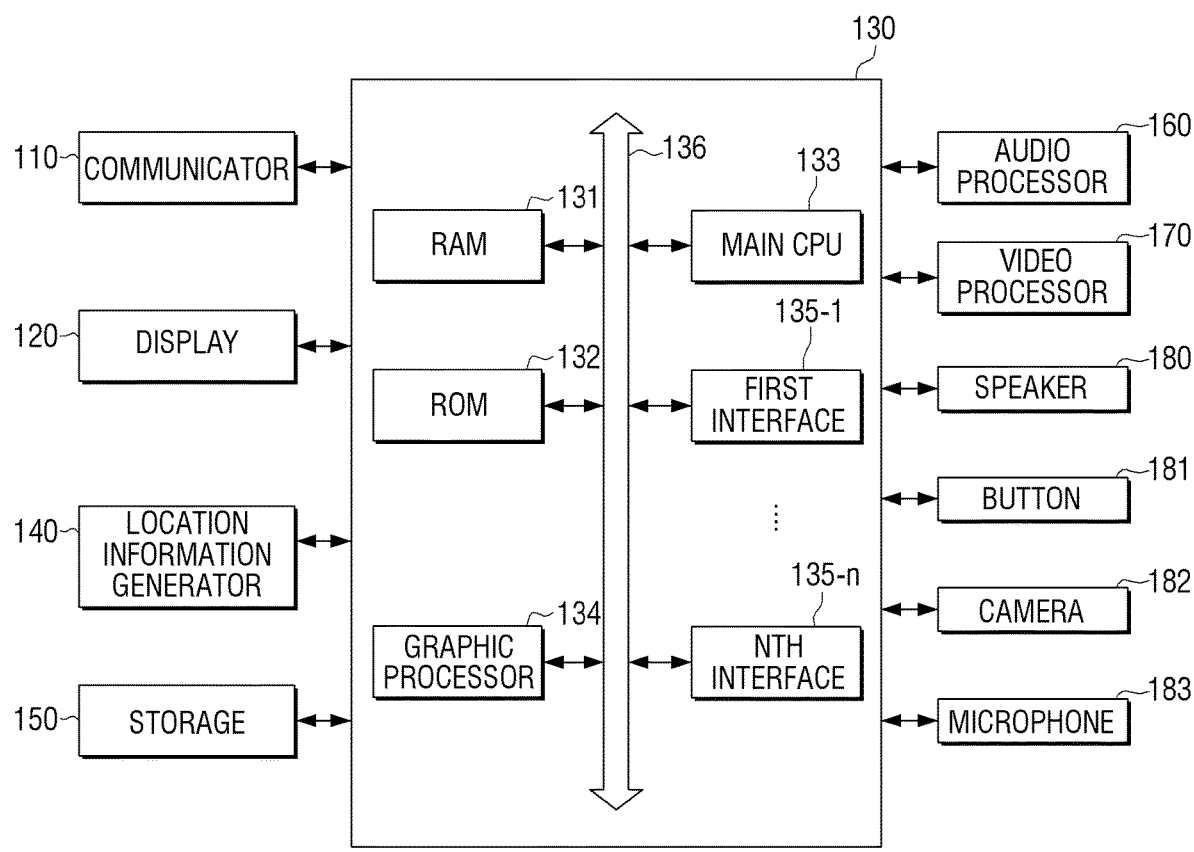
FIG. 8 is a block diagram for explaining a detailed configuration of a terminal apparatus according to an exemplary embodiment.

FIG. 8 is a block diagram for explaining a detailed configuration of a terminal apparatus according to an exemplary embodiment. According to FIG. 8, the terminal apparatus 100 may further include a location information generator 140, storage 150, audio processor 160, video processor 170, speaker 180, button 181, camera 182, and microphone 183 besides a display 120, communicator 110, and controller 130, and these configurations may be controlled by the controller 130 as well. Meanwhile, specific explanation on elements that overlap with those explained in FIG. 2 will be omitted.

The location information generator 140 generates location information that indicates the location of the terminal apparatus 100. More specifically, the location information generator 140 uses the GPS (Global Positioning System) module (not illustrated) to search the location of the terminal apparatus 100. For example, the GPS module (not illustrated) may receive a signal transmitted from a plurality of GPS satellites, and use the time difference between the transmission time and receiving time to calculate the distance between the satellite and terminal apparatus 100. In addition, it may calculate the current location of the terminal apparatus 100 in an arithmetic operation such as trilateration in consideration of the distance calculated between the plurality of satellites, and the location of the satellites etc.

Accordingly, the controller may execute the application using the location information generated in the location information generator 140. For example, when the map application is executed, the controller 130 may determine the current location of the terminal apparatus 100 using the location information generated in the location information generator 140, and display the map screen within a certain area based on the current location.

The storage 150 stores O/S (Operating System) for driving the terminal apparatus 100.

Specifically, the storage 150 may store various application programs and data related to execution of various application programs. In addition, the storage 150 may store various data for sharing the application execution screen and various data stored as a result of sharing together with the chatting service. In this case, the storage 150 may store data including various information input on the application execution screen per application.

The audio processor 160 may perform processing on audio data. For example, in the audio processor 160, various processing such as decoding, amplification, noise filtering etc. on audio data may be performed.

The video processor 170 may perform processing on video data. For example, the video processor 170 may perform various image processing such as decoding, scaling, noise filtering, frame rate conversion, and resolution conversion etc. regarding video data.

The speaker 180 is a configurative element that outputs not only various audio data processed in the audio processor 160 but also various alarm sounds and sound messages etc.

The button 181 may be one of various types such as a mechanical button, wheel etc. formed on an area such as the front portion, side portion, rear portion etc. of the exterior of the main body of the terminal apparatus 100. For example, a button for turning on/off power of the terminal apparatus 100 may be provided.

The camera 182 is a configurative element for photographing a still image or video. The camera 182 may be embodied as a plurality of cameras including a front camera and rear camera etc.

The microphone 183 is a configurative element for receiving the user's voice or guitar sound and converting the received sound into audio data. The controller 130 may use the user's voice input through the microphone 183 in a call process or convert it into audio data and store it in the storage 150.

Besides the above, the terminal apparatus 100 may further include various external input ports for connecting with various external terminals such as headset etc.

Meanwhile, the controller 140 includes a RAM 131, ROM 132, main CPU 133, graphic processor 134, first to nth interfaces 135-1 to 135-n, and bus 136.

The RAM 131, ROM 132, main CPU 133, graphic processor 134, first to nth interfaces 135-1 to 135-n may be connected to one another through the bus 136.

The first to nth interfaces 135-1 to 135-n are connected to the aforementioned various configurative elements. One of the interfaces may be a network interface that is connected to an external apparatus through network.

The main CPU 133 may access the storage 150, and perform booting using an O/S stored in the storage 150. In addition, the main CPU 133 may perform various operations using various application programs and data etc. stored in the storage 150.

In the ROM 132, command sets for booting the system are stored. When a turn on command is input and power is supplied, the main CPU 133 copies the O/S stored in the storage 150 to the RAM 131 according to the command stored in the ROM, and executes the O/S to boot the system. When booting is completed, the main CPU 133 copies various application programs (that is, application programs) stored in the storage 150 to the RAM 131, and executes the application programs copied to the RAM 131 to perform various operations.

The graphic processor 134 uses a calculator (not illustrated) and rendering part (not illustrated) to generate a screen including various objects such as an icon, image, and text etc. The calculator (not illustrated) calculates the feature values such as the coordinates, types, sizes, and colors etc. regarding the objects to be displayed according to the layout of the screen based on the control command received. The rendering part (not illustrated) generates screens of various layouts that include objects based on the feature values calculated in the calculator (not illustrated). The screens generated in the rendering part (not illustrated) are displayed within the display area of the display 120.

Figure 9:
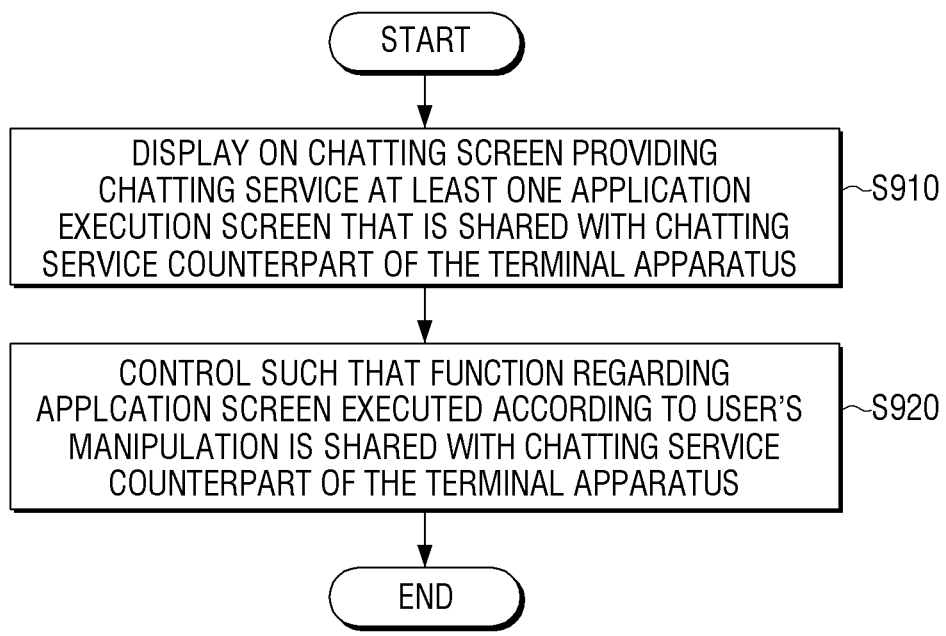
FIG. 9 is a flowchart for explaining a sharing method of a terminal apparatus that provides a chatting service according to an exemplary embodiment.

FIG. 9 is a flowchart for explaining a method for sharing a terminal apparatus providing a chatting service according to an exemplary embodiment.

First, on the chatting screen providing the chatting service, at least one application execution screen that is shared with the chatting service counterparts is displayed (S910).

Next, it is controlled such that a function regarding the application execution screen executed according to the user's manipulation is shared with the chatting service counterpart of the terminal apparatus (S920).

More specifically, it may be controlled such that the application execution screen where the GUI (Graphic User Interface) that corresponds to the user's manipulation is displayed is shared with the chatting service counterpart of the terminal apparatus.

For example, when the application execution screen is a map screen, it can be controlled such that a GUI is displayed on the point selected according to the user's manipulation, and that the map screen where the GUI is displayed is shared with the chatting service counterpart of the terminal apparatus.

By another example, in the case where the application execution screen is a calendar screen, it can be controlled such that a GUI is displayed on a date selected according to the user's manipulation on the calendar screen, and that the calendar screen where the GUI is displayed is shared with the chatting service counterpart of the terminal apparatus.

In addition, when the application execution screen shared with the charting service counterpart is displayed and the user's manipulation of selecting a menu item included in the application execution screen is input, the function corresponding to the user's manipulation of selecting a menu item may be executed. In this case, the address corresponding to the menu item may be accessed to download an application.

However, this is just an example, and thus various application execution screens may obviously be shared.

Meanwhile, it is possible to store the function regarding the application execution screen executed according to the user's manipulation in the application corresponding to each application execution screen. In addition, it is possible to store the function regarding the application execution screen executed according to the user's manipulation in the integrated application.

In addition, it is possible to control such that the chatting contents entered in the chatting screen may be shared with the chatting service counterpart of the terminal apparatus.

Furthermore, it is possible to display on one area the chatting content selected according to the predetermined user's manipulation of among the chatting contents entered in the chatting screen, and display the selecting menu item regarding the application execution screen related to the selected chatting content together with the selected chatting content. In this case, it is possible to control such that each application execution screen related to the selected chatting content is scrapped and stored.

Meanwhile, explanation on the specific method for sharing an application execution screen and on the screen displayed for this purpose was made with reference to FIGS. 1 to 9.

Meanwhile, there may be provided a non-transitory computer readable medium where a program for consecutively performing the sharing method is stored.

A non-transitory computer readable medium refers to a medium that may be read by an apparatus and that may store data semi-permanently unlike media that stores data for a short period of time such as a register, cache, and memory etc. For example, the various applications and programs mentioned above may be provided as being stored in non-transitory computer readable medium such as a CD, DVD, hard disk, Blu-ray disk, USB, memory card, and ROM etc.

Furthermore, although not illustrated in the aforementioned block diagram, communication between each of the configurative elements may be made through a bus. In addition, a terminal apparatus may further comprise a processor such as a CPU and microprocessor for performing the various steps mentioned above.

Although a few exemplary embodiments have been shown and described, it would be appreciated by those skilled in the art that changes may be made in this embodiment without departing from the principles and spirit of the invention, the scope of which is defined in the claims and their equivalents.

What is claimed is:

1. A method for an electronic device comprising:
    displaying, on a chat screen of a chat application, at least one message sent to an external electronic device or received from the external electronic device;
    based on a first user input for executing a map application being received through the chat screen:
        dividing the chat screen into a first area and a second area,
        displaying a map generated based on execution of the map application on the first area of the chat screen, the map being generated based on a current location of the electronic device,
        displaying the at least one message on the second area of the chat screen, and
        transmitting a first map data for displaying the map displayed on the first area of the chat screen to the external electronic device;
    after transmitting the first map data to the external electronic device, based on a second user input for displaying a message on the second area of the chat screen being received, displaying the message corresponding to the second user input on the second area of the chat screen,
    based on a third user input for manipulating the map displayed on the first area of the chat screen being received:
        displaying a graphical user interface (GUI) on the map based on the third user input, and
        transmitting a second map data for displaying the map including the GUI to the external electronic device,
    wherein the transmitting the first map data causes the external electronic device to display the map generated based on the execution of the map application on an external chat screen of the external electronic device, and
    wherein the transmitting the second map data causes the external electronic device to display the map including the GUI on the external chat screen of the external electronic device,
    wherein the method further comprises:
        based on a fourth user input for selecting the message corresponding to the second user input being received for more than a predetermined period of time, fixatedly displaying the selected message in a predetermined area of the chat screen with a menu including a map viewing message for displaying the map corresponding to the second map data which is transmitted to the external electronic device, and
        based on a fifth user input for selecting the menu including the map viewing message being received, displaying the map including the GUI on an entire area of the chat screen.

2. An electronic device comprising:
    a memory storing instructions; and
    a processor configured to execute the stored instructions to:
        display, on a chat screen of a chat application, at least one message sent to an external electronic device or received from the external electronic device;
        based on a first user input for executing a map application being received through the chat screen, divide the chat screen into a first area and a second area and display a map generated based on execution of the map application on the first area of the chat screen, the map being generated based on a current location of the electronic device, display the at least one message on the second area of the chat screen, and transmit a first map data for displaying the map displayed on the first area of the chat screen to the external electronic device; and
        after transmitting the first map data to the external electronic device, based on a second user input for displaying a message on the second area of the chat screen being received, display the message corresponding to the second user input on the second area of the chat screen,
        based on a third user input for manipulating the map displayed on the first area of the chat screen being received:
            display a graphical user interface (GUI) on the map based on the third user input and transmit a second map data for displaying the map including the GUI to the external electronic device, wherein the first map data transmitted to the external electronic device causes the external electronic device to display the map generated based on the execution of the map application on an external chat screen of the external electronic device, and wherein the second map data transmitted to the external electronic device causes the external electronic device to display the map including the GUI on the external chat screen of the external electronic device, wherein the processor is further configured to execute the stored instructions to:

based on a fourth user input for selecting the message corresponding to the second user input being received for more than a predetermined period of time, fixatedly display the selected message in a predetermined area of the chat screen with a menu including a map viewing message for displaying the map corresponding to the second map data which is transmitted to the external electronic device, and based on a fifth user input for selecting the menu including the map viewing message being received, display the map including the GUI on an entire area of the chat screen.

3. A non-transitory computer readable recording medium storing instructions executable by a processor of an electronic device to cause the processor to:

displaying, on a chat screen of a chat application, at least one message sent to an external electronic device or received from the external electronic device;

based on a first user input for executing a map application being received through the chat screen:

dividing the chat screen into a first area and a second area, displaying a map generated based on execution of the map application on the first area of the chat screen, the map being generated based on a current location of the electronic device, displaying the at least one message on the second area of the chat screen, and transmitting a first map data for displaying the map displayed on the first area of the chat screen to the external electronic device;

after transmitting the first map data to the external electronic device, based on a second user input for displaying a message on the second area of the chat screen being received, displaying the message corresponding to the second user input on the second area of the chat screen, based on a third user input for manipulating the map displayed on the first area of the chat screen being received:

displaying a graphical user interface (GUI) on the map based on the third user input, and transmitting a second map data for displaying the map including the GUI to the external electronic device, wherein the transmitting the first map data causes the external electronic device to display the map generated based on execution of the map application on an external chat screen of the external electronic device, and wherein the transmitting the second map data causes the external electronic device to display the map including the GUI on the external chat screen of the external electronic device, wherein the method further comprises:

based on a fourth user input for selecting the message corresponding to the second user input being received for more than a predetermined period of time, fixatedly displaying the selected message in a predetermined area of the chat screen with a menu including a map viewing message for displaying the map corresponding to the second map data which is transmitted to the external electronic device, and based on a fifth user input for selecting the menu including the map viewing message being received, displaying the map including the GUI on an entire area of the chat screen.

\* \* \* \* \*